(12) United States Patent
Choi et al.

(10) Patent No.: US 11,114,691 B2
(45) Date of Patent: Sep. 7, 2021

(54) SULFIDE-BASED SOLID ELECTROLYTE FOR LITHIUM BATTERY, METHOD OF PREPARING THE SAME, AND LITHIUM BATTERY INCLUDING THE SULFIDE-BASED SOLID ELECTROLYTE

(71) Applicants: Samsung Electronics Co., Ltd., Suwon-si (KR); Samsung SDI Co., Ltd., Yongin-si (KR)

(72) Inventors: Hongsoo Choi, Seoul (KR); Dongjin Lee, Seoul (KR); Joonseon Jeong, Seoul (KR)

(73) Assignees: SAMSUNG ELECTRONICS CO., LTD., Gyeonggi-Do (KR); SAMSUNG SDI CO., LTD., Gyeonggi-Do (KR)

(*) Notice: Subject to any disclaimer, the term of this patent is extended or adjusted under 35 U.S.C. 154(b) by 84 days.

(21) Appl. No.: 16/449,910

(22) Filed: Jun. 24, 2019

(65) Prior Publication Data

US 2020/0052330 A1 Feb. 13, 2020

(30) Foreign Application Priority Data

Aug. 10, 2018 (KR) .................. 10-2018-0093993

(51) Int. Cl.
| | | |
|---|---|---|
| *H01M 10/0565* | (2010.01) | |
| *H01M 10/052* | (2010.01) | |
| *H01M 4/136* | (2010.01) | |
| *H01M 4/58* | (2010.01) | |
| *H01M 4/525* | (2010.01) | |

(52) U.S. Cl.
CPC ....... *H01M 10/0565* (2013.01); *H01M 4/136* (2013.01); *H01M 4/525* (2013.01); *H01M 4/5815* (2013.01); *H01M 10/052* (2013.01)

(58) Field of Classification Search
CPC ..... H01M 10/0565; H01M 2300/0065; H01M 2300/0068
See application file for complete search history.

(56) References Cited

U.S. PATENT DOCUMENTS

| | | | |
|---|---|---|---|
| 8,802,320 B2 | 8/2014 | Choi et al. | |
| 9,105,940 B2 | 8/2015 | Lee et al. | |
| 9,929,435 B2* | 3/2018 | Cai | .................. H01M 10/0564 |
| 10,644,350 B2* | 5/2020 | Chang | .................. B01J 20/3085 |
| 2015/0171428 A1 | 6/2015 | Fujiki et al. | |
| 2016/0036054 A1 | 2/2016 | Yanagi et al. | |
| 2016/0064772 A1 | 3/2016 | Choi | |

(Continued)

FOREIGN PATENT DOCUMENTS

| | | |
|---|---|---|
| CN | 104701542 A | 6/2015 |
| CN | 105826602 A | 8/2016 |

(Continued)

OTHER PUBLICATIONS

Hwang et al, Fabrication and Electrochemical Properties of Li4Ti5O12@Li6PS5Cl for All-solid-state Lithium Batteries using Simple Mechanical Method, Int.J. Electrochemical Sci., 12(2017) 7795-7806 (Year: 2017).*

(Continued)

*Primary Examiner* — Amanda C. Walke
(74) *Attorney, Agent, or Firm* — Cantor Colburn LLP

(57) ABSTRACT

A sulfide solid electrolyte including: a sulfide electrolyte for a lithium battery; and a metal-organic framework.

20 Claims, 9 Drawing Sheets

(56) References Cited

U.S. PATENT DOCUMENTS

| | | | | |
|---|---|---|---|---|
| 2016/0064773 | A1* | 3/2016 | Choi | H01M 10/052 429/303 |
| 2016/0248120 | A1* | 8/2016 | Yamada | H01M 10/0562 |
| 2016/0336618 | A1* | 11/2016 | Lee | H01M 10/0565 |
| 2016/0336619 | A1* | 11/2016 | Choi | H01M 10/0565 |
| 2017/0018802 | A1* | 1/2017 | Omoda | H01M 4/5825 |
| 2017/0222244 | A1 | 8/2017 | Kim et al. | |
| 2017/0222257 | A1* | 8/2017 | Miyashita | C01B 25/14 |
| 2017/0294678 | A1* | 10/2017 | Lee | H01M 4/62 |
| 2017/0317352 | A1* | 11/2017 | Lee | H01M 4/134 |
| 2018/0226682 | A1* | 8/2018 | Lu | H01M 10/0525 |
| 2019/0190068 | A1* | 6/2019 | Lee | H01M 10/052 |
| 2020/0220219 | A1* | 7/2020 | Wang | H01M 2/145 |
| 2020/0227765 | A1* | 7/2020 | Robb | H01M 8/124 |
| 2020/0335818 | A1* | 10/2020 | Christensen | H01M 2/1686 |

FOREIGN PATENT DOCUMENTS

| | | | |
|---|---|---|---|
| KR | 20070077977 A | | 7/2007 |
| KR | 20090023995 A | | 3/2009 |
| KR | 20110136448 A | | 12/2011 |
| KR | 20120031738 A | | 4/2012 |
| KR | 20120108829 A | | 10/2012 |
| KR | 20130031738 A | | 3/2013 |
| KR | 20150069523 A | | 6/2015 |
| KR | 20160024610 A | | 3/2016 |
| KR | 20170092327 A | | 8/2017 |
| KR | 20170116464 A | | 10/2017 |
| WO | WO-2013099834 A1 | * | 7/2013 ............ H01M 6/18 |

OTHER PUBLICATIONS

Yu et al, Facile Synthesis toward the Optimal Structure-Conductivity Characteristics of the Argyrodite Li6PS5CI Solid-State Electrolyte, Applied Materials and Interfaces, 10, 33296-33306 (2018) (Year: 2018).*

Lian et al, Inorganic sulfide solid electrolytes for all-solidstate lithium secondary batteries, Journal of Materials Chemistry, 7, 20540-20557(2019) (Year: 2019).*

Suriyakumar et al, Metal organic framework laden polyethylene oxide) based composite electrolytes for all-solid-state Li-S and Li-metal polymer batteries, Electrochimica Acta, 285, 355-364 (2018) (Year: 2018).*

Hong et al, Confinement of polysulfides within bi-functional metal-organic frameworks for high performance lithium-sulfur batteries, Nanscale, 10, 2774-2780 (2018) (Year: 2018).*

Han et al, Metal-Organic-Framework-Based Gel Polymer Electrolyte with Immobilized Anions to Stabilize a Lithium Anode for a Quasi-Solid-State Lithium-Sulfur Battery, Applied Materials and Interfaces, 11, 18427-18435 (2019) (Year: 2019).*

Chen et al, Argyrodite Solid Electrolyte with a Stable Interface and Superior Dendrite Suppression Capability Realized by ZnO Co-Doping, Applied Materials and Interfaces, 11,40808-40816 (2019) (Year: 2019).*

Machine Translation of WO 2013/099834 (no date).*

Hao Min Chen et al., "Stability and ionic mobility in argyrodite-related lithium-ion solid electrolytes", Royal Society of Chemistry, May 29, 2015, pp. 1-13.

Mansi S. Shah et al., "Hydrogen Sulfide Capture: From Absorption in Polar Liquids to Oxide, Zeolite, and Metal-Organic Framework Adsorbents and Membranes", Chemical Reviews, Jul. 5, 2017, pp. 9755-9803, vol. 117.

Masahiro Tatsumisago et al., "Recent development of sulfide solid electrolytes and interfacial modification for all-solid-state rechargeable lithium batteries", Journal of Asian Ceramic Societies, Apr. 9, 2013, pp. 17-25, vol. 1.

Yoon Seok Jung et al., "Enhanced Stability of LiCoO2 Cathodes in Lithium-Ion Batteries Using Surface Modification by Atomic Layer Deposition", Journal of the Electrochemical Society, Nov. 18, 2009, pp. A75-A81, vol. 157.

Yuki Kato et al., "High-power all-solid-state batteries using sulfide superionic conductors", Nature energy, Apr. 2016, pp. 1-7, vol. 1.

Changfu Yuan et al., "Enhanced electrochemical performance of poly(ethylene oxide) based composite polymer electrolyte by incorporation of nano-sized metal-organic framework," Journal of Power Sources, available online May 16, 2013, pp. 653-658, vol. 240.

Jingyu Xi et al., "Enhanced electrochemical properties of PEO-based composite polymer electrolyte with shape-selective molecular sieves," Journal of Power Sources, available online Jul. 25, 2005, pp. 581-588, vol. 156.

* cited by examiner

SULFIDE-BASED SOLID ELECTROLYTE FOR LITHIUM BATTERY, METHOD OF PREPARING THE SAME, AND LITHIUM BATTERY INCLUDING THE SULFIDE-BASED SOLID ELECTROLYTE

CROSS-REFERENCE TO RELATED APPLICATIONS

This application claims priority to and the benefit of Korean Patent Application No. 10-2018-0093993, filed on Aug. 10, 2018, in the Korean Intellectual Property Office, and all the benefits accruing therefrom under 35 U.S.C. § 119, the entire content of which is incorporated herein by reference.

BACKGROUND

1. Field

The present disclosure relates to a sulfide-based solid electrolyte, a method of preparing the same, and a lithium battery including the sulfide-based solid electrolyte.

2. Description of the Related Art

Recently, with the explosive growth of the market for energy storage devices applicable to electric vehicles requiring the storage and use of large amounts of electrical energy, demand for lithium batteries with improved capacity and stability has increased. When lithium batteries storing a large amount of electrical energy are applied to electric vehicles, the problem of liquid electrolyte ignition arises. Accordingly, replacement of liquid electrolytes with an all-solid electrolyte is desired. Various studies have been carried out to commercialize sulfide-based electrolytes applicable to fast charge/discharge because of their good ionic conductivity.

However, in the case of a lithium battery using a sulfide-based all-solid electrolyte, although it is possible to lower the risk of explosion caused by thermal runaway due to a relatively highly exothermic reaction, there is still a problem in that hydrogen sulfide is generated by a rapid oxidation reaction when the sulfide-based all-solid electrolyte is exposed to air and moisture. The generation of hydrogen sulfide is also very harmful to the human body. In addition, generation of hydrogen sulfide rapidly increases the pressure in a battery cell and causes the separation of an active material, thereby deteriorating ion conductivity. These problems remain difficult to solve, due in part to the intrinsic characteristics of sulfide-based solid electrolytes containing sulfur.

SUMMARY

Provided is a sulfide-based solid electrolyte for a lithium battery and methods of preparing the same.

Provided is a lithium battery including the sulfide-based solid electrolytes.

Additional aspects will be set forth in part in the description which follows and, in part, will be apparent from the description, or may be learned by practice of the presented embodiments.

According to an aspect of an embodiment, a sulfide solid electrolyte includes: a sulfide electrolyte for a lithium battery; and a metal-organic framework.

According to an aspect of another embodiment, a lithium battery includes: a cathode, wherein the cathode does not comprise sulfur; an anode; and a sulfide solid electrolyte including a sulfide electrolyte, and a metal-organic framework between the cathode and the anode.

According to an aspect of another embodiment, a method of preparing a sulfide solid electrolyte includes: mixing the metal-organic framework with the sulfide electrolyte to obtain a mixture; and pressure-molding the mixture to prepare the sulfide solid electrolyte.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
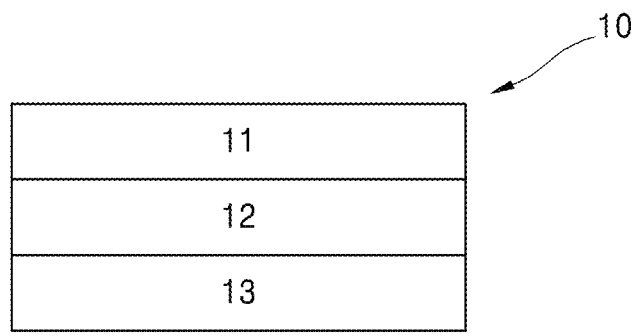
FIG. 1 is a schematic view illustrating an embodiment of a lithium battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain various aspects. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing a particular embodiment only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless defined otherwise, all terms (including technical and scientific terms) in the specification may be defined as commonly understood by one having ordinary skilled in the art. The terms defined in a generally-used dictionary may not be interpreted ideally or exaggeratedly unless clearly defined. In addition, unless explicitly described to the contrary, the word "comprise" and variations such as "comprises" or "comprising," will be understood to imply the inclusion of stated elements but not the exclusion of any other elements.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a sulfide-based solid electrolyte for a lithium battery, a preparation method thereof, and a lithium battery including the sulfide-based solid electrolyte according to embodiments will be described in more detail.

Provided a sulfide-based solid electrolyte for a lithium battery including a cathode which does not contain sulfur, including: a sulfide electrolyte; and a metal-organic framework.

In a lithium battery employing a sulfide electrolyte, it is very difficult to suppress the generation of hydrogen sulfide itself, and therefore venting of hydrogen sulfide to the outside is considered. Further, in a lithium battery employing a sulfide electrolyte and a lithium metal electrode, mechanical properties may deteriorate when lithium a dendrite grows.

In the sulfide-based solid electrolyte according to an embodiment, a metal-organic framework is combined with a sulfide electrolyte, so that hydrogen sulfide, e.g., hydrogen sulfide generated due to moisture exposure, is simultaneously adsorbed to lower a rate of hydrogen sulfide discharged to the outside. While not wanting to be bound by theory, it is understood venting of the hydrogen sulfide has the added benefit of suppressing the deterioration of ion conductivity. Because the metal-organic framework has suitable hydrogen sulfide adsorption and is nanoscale in size, a sulfide-based solid electrolyte having improved mechanical properties may be prepared by combing the metal-organic framework with a sulfide electrolyte.

In the sulfide-based solid electrolyte, the content of the metal-organic framework may be about 0.1 parts by weight to about 50 parts by weight, about 0.1 parts by weight to about 20 parts by weight, about 0.1 parts by weight to about 10 parts by weight, about 0.5 parts by weight to about 50 parts by weight, or about 1 part by weight to about 5 parts by weight, based on 100 parts by weight of the sulfide-based solid electrolyte. When the content of the metal-organic framework in the sulfide-based solid electrolyte is within the above range, the hydrogen sulfide generated in the lithium battery may be easily captured in the metal-organic framework, and thus it is possible to prevent the problems caused by the generation of hydrogen sulfide.

In the sulfide-based solid electrolyte according to an embodiment, the capturing function of hydrogen sulfide may be varied depending on the size, uniformity, and pore size of the metal-organic framework. When the size and uniformity of the metal-organic framework are suitably controlled, it is possible to minimize the deterioration of mechanical properties, such as ion conductivity and strength, when the sulfide-based solid electrolyte is exposed to moisture.

In the process of preparing the sulfide-based solid electrolyte by combining the sulfide electrolyte with the metal-organic framework, a uniform nanosized metal-organic framework may be used in order to reduce the deterioration of ion conductivity and strength.

The size of the metal-organic framework is about 1 nanometer (nm) to about 1 micrometer (μm), about 10 nm to about 0.9 μm, for example, about 100 nm to about 500 nm. As used herein, the term "size" indicates a major axis length. For example, when the metal-organic framework has a different form, the size may indicate a length of the largest side of the framework. When the metal-organic framework is spherical, the size may indicate an average diameter of the metal-organic framework. The specific surface area of the metal-organic framework may be 100 square meters per gram ($m^2/g$) or more, for example, 500 $m^2/g$ or more, and specifically, about 100 $m^2/g$ to about 4500 $m^2/g$, about 200 $m^2/g$ to about 4000 $m^2/g$, or about 400 $m^2/g$ to about 3500 $m^2/g$. Since the metal-organic framework has a large surface area within the above range, ion conductivity at room temperature may be improved.

The pore size of the metal organic structure may be in a range capable of capturing hydrogen sulfide. The pore size thereof refers to an average diameter of pores when pores are spherical, and may also refer to a major axis length when pores have non-spherical form. The pore size thereof may be about 1 nm to about 10 nm, for example, about 1 nm to about 8 nm, and for example, about 1 nm to about 5 nm.

Specifically, the metal-organic framework may have a mesoporous structure having a uniform pore size. In the metal-organic framework, a plurality of primary particles is dispersed in a matrix, and the size (e.g., diameter) of the plurality of primary particles has a uniform diameter distribution represented by Equation 1.

$$0 < \sigma^2/\mu < 1 \qquad \text{Formula 1}$$

In Formula 1, $\sigma^2$ is a diameter variance for the plurality of primary particles of the metal-organic framework, e.g., a diameter variance obtained by dynamic laser scattering (DLS), which may be equivalent to a square of a standard deviation of average particle diameter of the primary particles of the metal-organic network; and p is an average particle diameter of the plurality of primary particles.

The average diameter of the plurality of primary particles may be about 1 nm to about 1 μm, for example, about 10 nm to about 900 nm, about 100 nm to about 800 nm, specifically about 300 nm to about 500 nm. The shape of the primary particles may include various shapes such as spheres, ellipses, cylinders, triangles, squares, or polyhedrons. In an embodiment, the primary particles of the plurality of primary particles may have a similar shape. For example, the primary particles of the plurality of primary particles may be spherical. In the above Equation 1, $\sigma^2/p$ may be about 0.01 to about 0.5, for example, about 0.1 to about 0.3.

In the sulfide-based solid electrolyte according to an embodiment, the metal-organic framework is a porous crystalline compound in which a Group 2 to Group 15 metal ion, or a Group 2 to Group 15 metal ion cluster, is chemically bonded to an organic ligand. Since the metal-organic framework is porous, an ionic liquid can fill the pores of the metal-organic framework.

The organic ligand refers to an organic group capable of chemical bonding, such as coordinate bonding, ion bonding, or covalent bonding. For example, the organic ligand may be an organic group having a site capable of bonding with the above-mentioned metal ion, and in this case, the organic ligand is bonded with the metal ion to form a stable framework.

The Group 2 to Group 5 metal ion may be cobalt (Co), nickel (Ni), molybdenum (Mo), tungsten (W), ruthenium (Ru), osmium (Os), cadmium (Cd), beryllium (Be), calcium (Ca), barium (Ba), strontium (Sr), iron (Fe), manganese (Mn), chromium (Cr), vanadium (V), aluminum (Al), titanium (Ti), zirconium (Zr), copper (Cu), zinc (Zn), magnesium (Mg), hafnium (Hf), niobium (Nb), tantalum (Ta), rhenium (Re), rhodium (Rh), iridium (Ir), palladium (Pd), platinum (Pt), silver (Ag), scandium (Sc), yttrium (Y), indium (In), thallium (Tl), silicon (Si), germanium (Ge), tin (Sn), lead (Pb), arsenic (As), antimony (Sb), bismuth (Bi), or a combination thereof. The organic ligand may be a group derived from an aromatic dicarboxylic acid, an aromatic tricarboxylic acid, an imidazole compound, a tetrazole, 1,2,3-triazole, 1,2,4-triazole, pyrazole, an aromatic sulfonic acid, an aromatic phosphoric acid, an aromatic sulfinic acid, an aromatic phosphinic acid, a bipyridine, or a compound having a functional group that may be an amino group, an imino group, an amide group, a methane dithio acid group of the formula $—CS_2H$, a methane dithio acid anion group of the formula $—CS_2^-$, a pyridine group, a pyrazine group, or a combination thereof. The aromatic groups may have from 6 to 18 carbon atoms.

Examples of the aromatic dicarboxylic acid and the aromatic tricarboxylic acid include benzene dicarboxylic acid, benzene tricarboxylic acid, biphenyl dicarboxylic acid, and terphenyl-dicarboxylic acid.

The organic ligand may be a group originating from compounds represented by the following structures S1-S12.

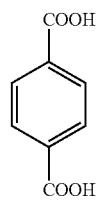

S1

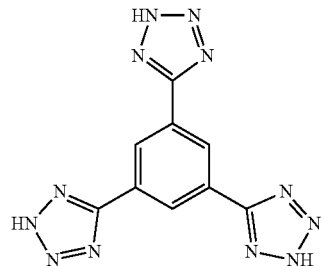

S2

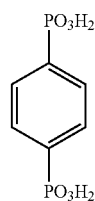

S3

-continued

S4 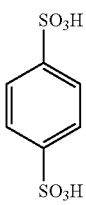

S5 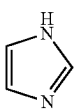

S6 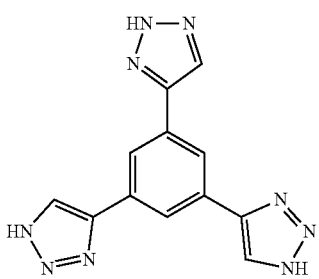

S7 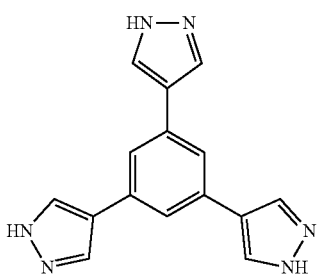

S8 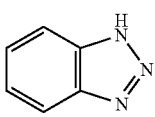

S9 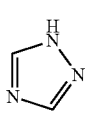

S10 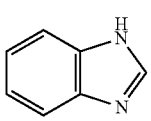

S11, S12 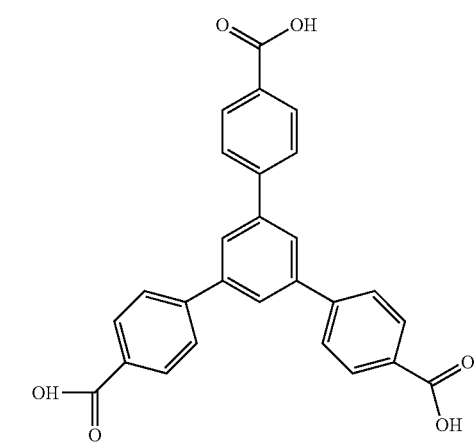

For example, the metal-organic framework may be a compound represented by Formula 1.

$$M_mO_kX_lL_p \qquad \text{Formula 1}$$

In Formula 1, M may be $Ti^{4+}$, $Zr^{4+}$, $Mn^{4+}$, $Si^{4+}$, $Al^{3+}$, $Cr^{3+}$, $V^{3+}$, $Ga^{3+}$, $Mn^{3+}$, $Zn^{+3}$, $Mn^{2+}$, $Mg^{2+}$, $Fe^{2+}$, $Fe^{3+}$, $Cu^{+2}$, or a combination thereof, m may be an integer from 1 to 10, k may be 0 or an integer from 1 to 10, l may be 0 or an integer from 1 to 10, p may be an integer from 1 to 10, X may be H, $OH^-$, $Cl^-$, $F^-$, $I^-$, $Br^-$, $SO_4^{2-}$, $NO_3^-$, $ClO_4^-$, $PF_6^-$, $BF_3^-$, $R^1$—$(COO)_n^-$, $R^1$—$(SO_3)_n^-$, or $R^1$—$(PO_3)_n^-$, wherein $R^1$ may be a hydrogen, a C1-C30 alkyl group, or a combination thereof, n may be an integer from 1 to 4, and L may be a ligand of the formula R—$(*COO-\#)_q$, including radical R with q carboxylate groups of the formula (*COO-#), wherein q may be an integer of 1 to 6, * may indicate a binding site of the carboxylate group to R, # may indicate a binding site of the carboxylate group to metal ion M, and R may be a substituted or unsubstituted C1-C30 alkyl group, a substituted or unsubstituted C2-C30 alkenyl group, a substituted or unsubstituted C2-C30 alkynyl group, a substituted or unsubstituted monocyclic C6-C30 aryl group, a substituted or unsubstituted polycyclic C10-C30 aryl group, a substituted or unsubstituted monocyclic C5-C30 heteroaryl group, a substituted or unsubstituted polycyclic C10-C30 heteroaryl group, or a combination thereof.

In Formula 1, m may be 1, 2, 3, or 4, for example, may be 1 or 3; k and l may be each independently 0, 1, 2, 3 or 4, for example, may be 0 or 1; and p may be 1, 2, 3, or 4, for example, may be 1 or 3.

With regard to the radical R of the ligand L, the substituted C1-C30 alkyl group, the substituted C2-C30 alkenyl group, the substituted alkynyl group, the substituted mono- and polycyclic C6-C30 aryl group, and the substituted mono- and polycyclic C3-C30 hetero group may each independently include a substituent selected from a C1-C10 alkyl group, a C2-C10 alkenyl group, a C2-C10 alkynyl group, a C3-C10 carbocyclic group, a C1-C10 heteroalkyl group, a C1-C10 haloalkyl group, a C6-C10 aryl group, a C3-C10 heteroaryl group, a C5-C30 heterocyclic group, a C1-C10 alkoxy group, a C6-C10 aryloxy group, a C3-C10 heteroaryloxy group, a C1-C10 alkylthio group, a C1-C10 heteroalkylthio group, a C6-C10 arylthio group, a C3-C10 heteroarylthio group, a halogen atom, —CN, —CF$_3$, —OH, —CHCl$_2$, —CH$_2$OH, —CH$_2$CH$_2$OH, —NH$_2$, —CH$_2$NH$_2$, —COOH, —COONH$_2$, —SO$_3$H, —CH$_2$SO$_2$CH$_3$, —PO$_3$H$_2$, a halogen atom, a C1-C30 alkyl group substituted with a halogen atom (for example, —CH$_2$CF$_3$, —CH$_2$CHF$_2$, —CH$_2$F, —CCl$_3$, and the like), a C1-C30 alkoxy group, a C2-C30 alkoxyalkyl group, a hydroxy group, a nitro group, a cyano group, an amino group, an amidino group, a hydrazine, a hydrazone, a carboxylic acid group or a salt thereof, a sulfonyl group, a sulfamoyl group, a sulfonic acid group or a salt thereof, a phosphoric acid group or a salt thereof, a C1-C30 alkyl group, a C2-C30 alkenyl group, a C2-C30 alkynyl group, a C1-C30 heteroalkyl group, a C6-C30 aryl group, a C7-C30 arylalkyl group, a C3-C30 heteroaryl group, a C4-C30 heteroarylalkyl group, a C3-C30 heteroaryloxy group, a C3-C30 heteroaryloxyalkyl group, a C4-C30 heteroarylalkyl group, or a combination thereof.

The metal-organic framework may be a compound represented by Formula 2.

Formula 2

In Formula 2, M' may be Ti$^{4+}$, Zr$^{4+}$, V$^{3+}$, Zn$^{+3}$, Fe$^{2+}$, Fe$^{3+}$, Cu$^{+2}$, or a combination thereof, L' is C$_6$H$_4$(CO$_2$)$_2$ (terephthalate), C$_2$H$_2$(CO$_2^-$)$_2$ (fumarate), C$_4$H$_4$(CO$_2^-$)$_2$ (muconate), C$_5$H$_3$S(CO$_2^-$)$_2$ (2,5-thiophenedicarboxylate), C$_6$H$_2$N$_2$(CO$_2^-$)$_2$(2,5-pyrazine dicarboxylate), C$_2$H$_4$(CO$_2^-$)$_2$ (succinate), C$_3$H$_6$(CO$_2^-$)$_2$ (glutarate), C$_4$H$_8$(CO$_2^-$)$_2$ adipate, C$_{10}$H$_6$(CO$_2^-$)$_2$ (naphtalene-2,6-dicarboxylate), C$_{12}$H$_8$(CO$_2^-$)$_2$ (biphenyl-4,4'-dicarboxylate), C$_{12}$H$_8$N$_2$(CO$_2^-$)$_2$ (azobenzenedicarboxylate), C$_6$H$_3$(CO$_2^-$)$_3$ (benzene-1,2,4-tricarboxylate), C$_6$H$_3$(CO$_2^-$)$_3$ (benzene-1,3,5-tricarboxylate), C$_{24}$H$_{15}$(CO$_2^-$)$_3$(benzene-1,3,5-tribenzoate), C$_6$H$_2$(CO$_2^-$)$_4$(benzene-1,2,4,5-tetracarboxylate), C$_{10}$H$_4$(CO$_2^-$)$_4$ (naphtalene-2,3,6,7-tetracarboxylate), C$_{10}$H$_4$(CO$_2^-$)$_4$ (naphtalene-1,4,5,8-tetracarboxylate), C$_{12}$H$_6$(CO$_2^-$)$_4$ (biphenyl-3,5,3',5'-tetracarboxylate), or a combination thereof, X$^-$ is OH$^-$, Cl$^-$, F$^-$, CH$_3$COO$^-$, PF$_6^-$, ClO$_4^-$, or a combination thereof, and m is an integer from 1 to 8, k is 0 or an integer from 1 to 8, l is 0 or an integer from 1 to 8, and p is an integer from 1 to 8.

The metal-organic framework may be Ti$_8$O$_8$(OH)$_4$[O$_2$C—C$_6$H$_4$—CO$_2$]$_6$, Ti$_8$O$_8$(OH)$_4$[O$_2$C—C$_6$H$_3$(NH$_2$)—CO$_2$]$_6$, VO[C$_6$H$_4$(CO$_2$)$_2$], Al(OH)[C$_6$H$_4$(CO$_2$)$_2$], Cr(OH)[C$_6$H$_4$(CO$_2$)$_2$], Al(OH)[C$_{10}$H$_6$(CO$_2$)$_2$], Cr$_3$OX$_l$[C$_6$H$_4$(CO$_2$)$_2$]$_3$ (wherein X may be H, OH$^-$, Cl$^-$, F$^-$, CH$_3$COO$^-$, PF$_6^-$, ClO$_4^-$, or a combination thereof, and l may be 0 or an integer of 1 to 8), Cr$_3$OX$_l$[C$_{12}$H$_8$(CO$_2$)$_2$]$_3$ (wherein X may be —H, OH$^-$, Cl$^-$, F$^-$, CH$_3$COO$^-$, PF$_6^-$, ClO$_4^-$, or a combination thereof, and l may be 0 or an integer of 1 to 8), Cr$_3$OX$_l$[C$_6$H$_3$(CO$_2$)$_3$]$_3$ (wherein X may be H, OH$^-$, Cl$^-$, F$^-$, CH$_3$COO$^-$, PF$_6^-$, ClO$_4^-$, or a combination thereof, and l may be 0 or an integer of 1 to 8), Al$_8$(OH)$_{15}$(H$_2$O)$_3$[C$_6$H$_3$(CO$_2$)$_3$]$_3$, V$_3$OX$_l$[C$_6$H$_3$(CO$_2$)$_3$]$_3$ (wherein X may be H, OH$^-$, Cl$^-$, F$^-$, CH$_3$COO$^-$, PF$_6^-$, ClO$_4^-$, or a combination thereof, and l may be 0 or an integer of 1 to 8), ZrO[C$_6$H$_4$(CO$_2$)$_2$], or a combination thereof.

For example, the metal-organic framework may be Ti$_8$O$_8$(OH)$_4$[O$_2$C—C$_6$H$_4$—CO$_2$]$_6$, Cu (bpy)(H$_2$O)$_2$(BF$_4$)$_2$(bpy) (wherein "bpy" indicates 4,4'-bipyridine), Zn$_4$O(O$_2$C—C$_6$H$_4$—CO$_2$)$_3$ (Zn-terephthalic acid-MOF, Zn-MOF), or Al(OH){O$_2$C—C$_6$H$_4$—CO$_2$}.

The metal-organic framework may be Ti$_8$O$_8$(OH)$_4$[O$_2$C—C$_6$H$_3$(NH$_2$)—CO$_2$]$_6$, VO[C$_6$H$_4$(CO$_2$)$_2$], Al(OH)[C$_6$H$_4$(CO$_2$)$_2$], Cr(OH)[C$_6$H$_4$(CO$_2$)$_2$], Al(OH)[C$_{10}$H$_6$(CO$_2$)$_2$], Al$_1$O(OH)$_{18}$(H$_2$O)$_3$[C$_6$H$_3$—(CO$_2$)$_3$]$_6$.nH$_2$O, Cr$_3$OX$_l$[C$_6$H$_4$(CO$_2$)$_2$]$_3$ (wherein X may be H, OH$^-$, Cl$^-$, F$^-$, CH$_3$COO$^-$, PF$_6^-$, ClO$_4^-$, or a combination thereof, and l may be 0 or an integer from 1 to 8), Cr$_3$OX$_1$[C$_{12}$H$_8$(CO$_2$)$_2$]$_3$ (wherein X may be —H, OH$^-$, Cl$^-$, F$^-$, CH$_3$COO$^-$, PF$^-$, ClO$_4^-$, or a combination thereof, and l may be 0 or an integer of 1 to 8), Cr$_3$OX$_l$[C$_6$H$_3$(CO$_2$)$_3$]$_3$ (wherein X may be H, OH$^-$, Cl$^-$, F$^-$, CH$_3$COO$^-$, PF$_6^-$, ClO$_4^-$, or a combination thereof, and l may be 0 or an integer of 1 to 8), Al$_8$(OH)$_{15}$(H$_2$O)$_3$[C$_6$H$_3$(CO$_2$)$_3$]$_3$, V$_3$OX$_l$[C$_6$H$_3$(CO$_2$)$_3$]$_3$ (wherein X may be H, OH$^-$, Cl$^-$, F$^-$, CH$_3$COO$^-$, PF$_6^-$, ClO$_4^-$, or a combination thereof, and l may be 0 or an integer of 1 to 8), ZrO[C$_6$H$_4$(CO$_2$)$_2$], Ti$_8$O$_8$(OH)$_4$[O$_2$C—C$_6$H$_3$(NH$_2$)—CO$_2$]$_6$, or a combination thereof.

For example, the metal-organic framework may be, but is not limited to, Ti$_8$O$_8$(OH)$_4$[O$_2$C—C$_6$H$_4$—CO$_2$]$_6$, Cu (bpy) (H$_2$O)$_2$(BF$_4$)$_2$(bpy) (wherein bpy is 4,4'-bipyridine), Zn$_4$O (O$_2$C—C$_6$H$_4$—CO$_2$)$_3$(Zn-terephthalic acid-MOF, Zn-MOF), Al(OH)(O$_2$C—C$_6$H$_4$—CO$_2$), Cu-BTC MOF (copper benzene-1,3,5-tricarboxylate), ZIF-8 (2-methyl imidazole zinc salt), MIL 53 (aluminum terephthalate), Fe-BTC (Iron 1,3,5-benzenetricarboxylate), KRICT F100 (Iron trimesate), KRICT C100 (chromium terephthalate), KRICT C200 (Copper trimesate), KRICT Z100 (zirconium carboxylate), or a combination thereof.

In an embodiment, the metal-organic framework may include a plurality of primary particles having a uniform size that do not agglomerate together in an ion-conductive polymer matrix of a polymer electrolyte. A metal-organic framework having these characteristics may be useful as a support for the ionic liquid.

Hereinafter, a method of preparing a metal-organic framework, according to an embodiment of the present disclosure will be described.

A metal-organic framework may be prepared using a metal-organic framework composition including a metal ion precursor, an organic ligand precursor, and a solvent by a hydrothermal synthesis method, a microwave or ultrasonic synthesis method, or an electrochemical synthesis method. The metal-organic framework composition may include an organic ligand precursor and a metal ion precursor in a stoichiometric ratio.

Examples of the metal ion precursor include titanium isopropoxide, titanium ethoxide, titanium butoxide, and aluminum nitrate. Examples of the organic ligand precursor include 1,4-benzene-dicarboxylic acid, 1,3,5-benzene tricarboxylic acid, biphenyl dicarboxylic acid, and terphenyl-dicarboxylic acid. Examples of the solvent may include ethanol, N,N-dimethyl formamide, tetrahydrofuran, methylethyl ketone, acetonitrile, methylene chloride, and mixtures thereof. The amount of the solvent may be in a range of about 100 parts to about 3,000 parts by weight, based on 100 parts by weight of a total weight of the metal-organic framework.

To obtain a metal-organic framework having a uniform particle size as represented by Equation 1, the amount of the organic ligand precursor may be greater than a stoichiometric amount with respect to the amount of the metal ion precursor in preparing a metal-organic framework composition. For example, the amount of the organic ligand precursor may be in a range of about 1.3 moles to about 100 moles, and in some embodiments, about 1.5 moles to about 50 moles, and in some other embodiments, about 1.3 moles to about 20 moles, based on 1 mole of the metal ionic precursor. When the amount of the organic ligand precursor is within these ranges, the metal-organic framework may be uniformly distributed in an ion-conductive polymer matrix of a polymer electrolyte, and thus form the polymer electrolyte having high ionic conductivity without deterioration in mechanical characteristics.

According to an embodiment, the metal-organic framework may be obtained by thermally treating the metal-organic framework composition at a temperature of about 50° C. to about 500° C. and then by work-up. However, the thermal treatment condition is not limited to the above.

The reaction product may further be thermally treated at a temperature of about 100° C. to about 1200° C., if desired.

The metal-organic framework is not limited to any particular form. For example, the metal-organic framework may be provided in the form of powder, thin film, membrane, pellet, slurry, paste, paint, bead, honeycomb, mesh, fiber, corrugated sheet, or disk.

In the sulfide-based solid electrolyte according to an embodiment, the supporting of the solid electrolyte on the metal-organic framework may be confirmed by X-ray analysis and thermogravimetric analysis of the sulfide-based solid electrolyte. Since the metal-organic framework has a metal oxide form in which pores are regularly arranged, as a result of X-ray diffraction analysis using Cu Kα radiation, a main peak appears at a diffraction angle of 10° or less, for example, 5° or less, and for example, 3° or less, e.g., 0.01° to 5°, or 0.1° to 3° two-theta (2θ). The main peak is a diffraction characteristic resulting from a structure in which pores are regularly arranged. The presence and content of the metal-organic framework in the sulfide-based solid electrolyte may be confirmed by thermogravimetric analysis. The cross-section of a sample may be obtained by Focus Ion Beam (FIB) SEM, and the presence of a nanosized metal-organic framework may be confirmed by elemental analysis.

The sulfide electrolyte constituting the sulfide-based solid electrolyte may have a glass-ceramic form obtained by heat-treating crystalline glass at a low temperature, for example, at 500° C. to 800° C.

The sulfide electrolyte may be a solid electrolyte including $Li_2S$—$P_2S5$, $SiS_2$, $GeS_2$, $B_2S_3$, or a combination thereof. The sulfide electrolyte may be an inorganic solid electrolyte obtained by adding $Li_3PO_4$, halogen, a halogen compound, LISICON ($Li_{3.25}Ge_{0.25}P_{0.75}S_4$), LIPON ($Li_{3+y}PO_{4-x}N_x$), or thio-LISICON ($Li_{3.25}Ge_{0.25}P_{0.75}S_4$), $Li_2O$—$Al_2O_3$—$TiO_2$—$P_2O_5$(LATP) to $Li_2S$—$P_2S_5$, $SiS_2$, $GeS_2$, $B_2S_3$, or a combination thereof.

For example, the sulfide electrolyte may be $Li_2S$—$P_2S_5$, LiI—$Li_2S$—$B_2S_3$, $Li_3PO_4$—$Li_2S$—$Si_2S$, $Li_3PO_4$—$Li_2S$—$SiS_2$, $LiPO_4$—$Li_2S$—$SiS$, LiI—$Li_2S$—$P_2O_5$, LiI—$Li_3PO_4$—$P_2S_5$, $Li_3PS_4$, $Li_2S$—$P_2S_5$—LiI, $Li_2S$—$Si_2S_5$—LiI, $Li_2S$—$B_2S_3$—LiI, $Li_2S$—$Si_2S_5$—$Li_3N$, $Li_4Ge_{1-x}P_xS_4$ (0<x<1), $Li_{10\pm1}MP_2X_{12}$ (M is Ge, Si, Sn, Al, or a combination thereof), $Li_3PS_4$, $Li_4SnS_4$, $Li_{4-x}Sn_{4-a}As_aS_4$ (0≤x<4, 0<a<4), $Li_6Z^{5+}S_{5-a}X_a^{2-}Y^-$ ($Z^{5+}$ is P, As, Sb, or a combination thereof, $X^{2-}$ is Se Te, or a combination thereof, and $Y^{1-}$ is Cl, Br, I, F, CN, OCN, SCN, $N_3$, or a combination thereof, 0≤a≤2), $Li_7Z^{5+}S_{6-a}X_a^{2-}(Z^{5+}$ is P, As, Sb, or a combination thereof, and $X^{2-}$ is Se or Te, 0≤a≤2), or combination thereof.

The sulfide electrolyte may be $Li_6Z^{5+}S_{5-a}X_a^{2-}Y^-$ ($Z^{5+}$ may be P, As, Sb, or a combination thereof, $X^{2-}$ is Se, Te, or a combination thereof, and $Y^{1-}$ is Cl, Br, I, F, CN, OCN, SCN, $N_3$, or a combination thereof, 0≤a≤2) having a cubic argyrodite crystal structure.

The sulfide electrolyte may be $Li_6PS_5Cl$, $Li_7PS_6$, $Li_6PS_5SeCl$, or a combination thereof.

The sulfide-based solid electrolyte according to an embodiment may further include a binder. When the sulfide-based solid electrolyte further includes a binder, the workability of the sulfide-based solid electrolyte may be improved, and thus the shape of the sulfide-based solid electrolyte may be easily made as desired. The binder may be a fluorine-based polymer. Examples of the fluorine-based polymer may include polytetrafluoroethylene and vinylidene fluoride-hexafluoropropylene.

The amount of hydrogen sulfide ($H_2S$) generated from the sulfide-based solid electrolyte is 10 cubic centimeters per gram ($cm^3 \cdot g^{-1}$) or less when the sulfide-based solid electrolyte is exposed to air. When the sulfide-based solid electrolyte is exposed to air at a dew point of about −32° C. to about −28° C. and at a temperature of about 20° C. to about 25° C., an amount of hydrogen sulfide generated from the sulfide-based solid electrolyte is reduced by about 40% to about 60%, and maximum hydrogen sulfide discharge time is reduced by about 20% to about 30%, as compared with a sulfide-based solid electrolyte not including the metal-organic framework.

The thickness of the sulfide-based solid electrolyte is about 1 nm to about 1,000 μm, for example, about 20 μm to about 100 μm.

A lithium battery may include a lithium anode including a lithium metal electrode or a lithium metal alloy electrode as an anode. The lithium battery employing a lithium anode is a lithium metal battery.

Hereinafter, a lithium battery according to an embodiment will be described with reference to FIG. 1.

The lithium battery may include a lithium anode including a lithium metal electrode or a lithium metal alloy electrode as an anode. The lithium battery employing a lithium anode is a lithium metal battery.

The lithium metal battery 10 has a structure in which the sulfide-based solid electrolyte 12 according to an embodiment is disposed between a cathode 11 and an anode 13.

The anode may comprise a lithium metal electrode or a lithium metal alloy electrode. The anode may include an anode active material comprising a carbonaceous material, silicon, a silicon oxide, a silicon alloy, a silicon-carbon composite, tin, a tin alloy, a tin-carbon composite, a metal and/or metalloid alloyable with lithium, alloys thereof, or an oxide thereof. A combination comprising at least one of the foregoing anode active materials may be used.

The anode may be a lithium metal electrode or a lithium metal alloy electrode, and the solid electrolyte may be an anode protection film, or both an anode protection film and electrolyte.

The lithium battery may further comprise another solid electrolyte, a gel electrolyte, or a polymeric ionic liquid.

The operating voltage of the lithium battery may be 4 V or more.

The lithium battery comprising the solid electrolyte is disposed between a cathode and an anode may be an all-solid lithium battery.

Lithium thin films may be laminated on both sides of the solid electrolyte to produce a lithium symmetric cell. When a lithium symmetric cell comprising an electrolyte not comprising the metal-organic framework is exposed to air for 24 hours at a dew point of about −30° C. to about 45° C. and a temperature of about 20° C. to about 25° C., the ion conductivity of the solid electrolyte is not substantially reduced based on the ion conductivity of the solid electrolyte before this lithium symmetric cell is exposed. However, if the lithium symmetric cell is exposed for one week under the above conditions, an ion conductivity decay may be 85% or more, e.g., about 90%, based on the ion conductivity of the solid electrolyte before the lithium symmetric cell is exposed.

The ion conductivity of the solid electrolyte according to an embodiment is about 0.5 millisiemens per centimeter (mS/cm) to about 5 mS/cm, about 1 mS/cm to about 4 mS/cm, or about 1.5 mS/cm to about 3.5 mS/cm. For example, the ion conductivity of the sulfide-based solid electrolyte is about 0.1 mS/cm to about 2 mS/cm, for example, about 1.78 mS/cm, even after exposure to moisture at 25° C. for 1 hour. Lithium thin films may be laminated on both sides of the solid electrolyte to produce a lithium symmetric cell. When a lithium symmetric cell comprising an electrolyte comprising the metal-organic framework is exposed to air for one week at a dew point of about −30° C. to about −46° C. and a temperature of about 20° C. to about 25° C., an ion conductivity decay is reduced as compared with the ion conductivity of a lithium symmetric cell obtained by using a solid electrolyte not including a metal-organic framework. The ion conductivity of the sulfide-based solid electrolyte of the lithium battery after exposure to dry air is about 1 mS/cm or more, and the decay of the ion conductivity of the sulfide-based solid electrolyte to the ion conductivity of a sulfide-based solid electrolyte not including a metal-organic framework is about 5% to about 15%. For example, when the ion conductivity decay of a sulfide-based solid electrolyte not including a metal-organic framework after exposure to dry air is about 90%, the ion conductivity decay of the sulfide-based solid electrolyte including a metal-organic framework is about 80% to about 85%.

The lithium battery may be manufactured as follows.

First, a cathode is prepared. The cathode is a non-sulfur cathode. The non-sulfur cathode refers to a cathode using an active material containing no sulfur as a cathode active material.

For example, a cathode active material composition, in which a cathode active material, a conductive material, a binder, and a solvent are mixed, is prepared. A metal collector is directly coated with the cathode active material composition and then dried to fabricate a cathode plate. Alternately, the cathode active material composition is cast on a separate support to form a film, and then the film is detached from the support and laminated on the metal collector to fabricate a cathode plate.

The cathode active material may comprise lithium cobalt oxide, lithium nickel cobalt manganese oxide, lithium nickel cobalt aluminum oxide, lithium iron phosphate, lithium manganese oxide, or a combination thereof, but is not limited thereto. Any suitable cathode active material not comprising sulfur may be used.

For example, the cathode active material may be a compound represented by one of the following formulae: $Li_aA_{1-b}B'_bD_2$ (wherein $0.90 \le a \le 1.8$, and $0 \le b \le 0.5$); $Li_aE_{1-b}B'_bO_{2-c}D_c$ (wherein $0.90 \le a \le 1.8$, $0 \le b \le 0.5$, and $0 \le c \le 0.05$); $Li_aE_{2-b}B'_bO_{4-c}D_c$ (wherein $0 \le b \le 0.5$, and $0 \le c \le 0.05$); $Li_aNi_{1-b-c}Co_bB'_cD_\alpha$ (wherein $0.90 \le a \le 1.8$, $0 \le b \le 0.5$, $0 \le c \le 0.05$, and $0 < \alpha \le 2$); $Li_aNi_{1-b-c}Co_bB'_cO_{2-\alpha}F'_\alpha$ (wherein $0.90 \le a \le 1.8$, $0 \le b \le 0.5$, $0 \le c \le 0.05$, and $0 < \alpha < 2$); $Li_aNi_{1-b-c}Co_bB'_cO_{2-\alpha}F'_\alpha$ (wherein $0.90 \le a \le 1.8$, $0 \le b \le 0.5$, $0 \le c \le 0.05$, and $0 < \alpha \le 2$); $Li_aNi_{1-b-c}Mn_bB'_cD_\alpha$ (wherein $0.90 \le a \le 1.8$, $0 \le b \le 0.5$, $0 \le c \le 0.05$, and $0 < \alpha \le 2$); $Li_aNi_{1-b-c}Mn_bB'_cO_{2-\alpha}F'_\alpha$ (wherein $0.90 \le a \le 1.8$, $0 \le b \le 0.5$, $0 \le c \le 0.05$, and $0 < \alpha < 2$); $Li_aNi_{1-b-c}Mn_bB'_cO_{2-\alpha}F'_\alpha$ (wherein $0.90 \le a \le 1.8$, $0 \le b \le 0.5$, $0 \le c \le 0.05$, and $0 < \alpha < 2$); $Li_aNi_bE_cG_dO_2$ (wherein $0.90 \le a \le 1.8$, $0 \le b \le 0.9$, $0 \le c \le 0.5$, and $0.001 \le d \le 0.1$); $Li_aNi_bCo_cMn_dGeO_2$ (wherein $0.90 \le a \le 1.8$, $0 \le b \le 0.9$, $0 \le c \le 0.5$, $0 \le d \le 0.5$, and $0.001 \le e \le 0.1$); $Li_aNiG_bO_2$ (wherein $0.90 \le a \le 1.8$, and $0.001 \le b \le 0.1$); $Li_aCoG_bO_2$ (wherein $0.90 \le a \le 1.8$, and $0.001 \le b \le 0.1$); $Li_aMnGbO_2$ (wherein $0.90 \le a \le 1.8$, and $0.001 \le b \le 0.1$); $Li_aMn_2G_bO_4$ (wherein $0.90 \le a \le 1.8$, and $0.001 \le b \le 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \le f \le 2$); $Li_{(3-f)}Fe_2(PO_4)_3$ (wherein $0 \le f \le 2$); and $LiFePO_4$.

In the formulae above, A is Ni, Co, Mn, or a combination thereof; B' is Al, Ni, Co, Mn, Cr, Fe, Mg, Sr, V, a rare earth element, or a combination thereof; D is O, F, S, P, or a combination thereof; F' is F, S, P, or a combination thereof; G is Al, Cr, Mn, Fe, Mg, La, Ce, Sr, V, or a combination thereof; Q is Ti, Mo, Mn, or a combination thereof; I' is Cr, V, Fe, Sc, Y, or a combination thereof; and J is V, Cr, Mn, Co, Ni, Cu, or a combination thereof.

Of course, a compound having a coating layer on the surface of the above compound may also be used, or a mixture of the above compound and the compound having a coating layer may also be used. This coating layer may include a coating element compound such as an oxide of a coating element, a hydroxide of a coating element, an oxyhydroxide of a coating element, an oxycarbonate of a coating element, or a hydroxycarbonate of a coating element. The compound constituting the coating layer may be amorphous or crystalline. As the coating element included in the coating layer, Mg, Al, Co, K, Na, Ca, Si, Ti, V, Sn, Ge, Ga, B, As, Zr, or a combination thereof may be used. In the process of forming the coating layer, any suitable coating method (for example, spray coating or dip coating) may be used as long as it does not adversely affect the physical properties of the cathode active material. Details of the coating method can be determined by one of skill in the art without undue experimentation will not be further described herein for clarity.

For example, $LiNiO_2$, $LiCoO_2$, $LiMn_xO_{2x}$ (x=1 or 2), $LiNi_xMn_xO_2$ ($0<x<1$), $LiNi_{1-x-y}Co_xMn_yO_2$ ($0 \le x \le 0.5$, $0 \le y \le 0.5$), $LiFeO_2$, $V_2O_5$, TiS, or MoS may be used.

The conductive material, binder, and solvent in the cathode active material composition are the same as those in the anode active material composition. Pores may be formed in an electrode plate by adding a plasticizer to the cathode active material composition and/or the anode active material composition.

The content of the cathode active material, the content of a conductive material, the content of a binder, and the content of a solvent are suitable levels used in the field of lithium batteries. At least one of a conductive material, a binder, and a solvent may be omitted depending on the use and configuration of the lithium battery.

Next, the sulfide-based solid electrolyte is disposed between the cathode and the anode.

A separator, e.g., a microporous polyethylene separator, may be inserted therebetween.

The separator may comprise a modified microfibrillated cellulose having a carboxyl group on a surface thereof. The counter ions of the carboxyl group include lithium ions. With respect to the counter ions, the weight of other metal ions to the total lithium ions may be about 10 weight percent (wt %) or less, e.g., about 0.1 wt % to about 10 wt %, or about 1 wt % to about 5 wt %, based on a total weight of the lithium ions. The average pore diameter of the separator may be about 0.05 μm to 1 μm.

Next, an electrolyte is prepared. The electrolyte may be in a liquid or gel state.

For example, the electrolyte may be an organic electrolyte. The organic electrolyte may be prepared by dissolving a lithium salt in an organic solvent. As the organic solvent, an aprotic solvent may be used. The aprotic solvent may comprise a carbonate. The carbonate may be linear or cyclic, and may be fluorinated. Representative carbonates include at least one selected from diethyl carbonate ("DEC"), dimethyl carbonate ("DMC"), dipropyl carbonate ("DPC"), methyl propyl carbonate ("MPC"), ethyl propyl carbonate ("EPC"), methyl ethyl carbonate ("MEC"), or a combination thereof, and the cyclic carbonate compound may be, for example, ethylene carbonate ("EC"), propylene carbonate ("PC"), butylene carbonate ("BC"), vinyl ethylene carbonate ("VEC"), fluoroethylene carbonate ("FEC"), 4,5-difluoroethylene carbonate, 4,4-difluoroethylene carbonate, 4,4,5-trifluoroethylene carbonate, 4,4,5,5-tetrafluoroethylene carbonate, 4-fluoro-5-methylethylene carbonate, 4-fluoro-4-methylethylene carbonate, 4,5-difluoro-4-methyl ethylene carbonate, 4,4,5-trifluoro-5-methylethylene carbonate, and trifluoromethyl ethylene carbonate.

As the lithium salt, a lithium salt included in the electrolyte may also be used. The lithium salt may comprise $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, $NaAsF_6$, or a combination thereof.

The electrolyte may include polymer, e.g., a copolymer, e.g., a random copolymer. The polymer may comprise polyethylene oxide, polyethylene oxide comprising a metal salt, poly(methyl (meth)acrylate), polypropylene oxide, polyvinylidene fluoride, polystyrene, polyvinyl chloride, polyvinyl alcohol, polyacrylonitrile, polyester sulfide, or a combination thereof. The polymer may be an ionically conductive polymer and can optionally further comprise a lithium salt, for example $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, or a combination thereof.

An ionic liquid may be added to the electrolyte.

The ionic liquid is an ionic material existing in a molten state at room temperature (25° C.), and may be used without limitation as long as it contains cations and anions. Examples of the cations of the ionic liquid may include, but are not limited to, imidazolium, ammonium, pyrrolidinium, and piperidinium. Examples of the anions of the ionic liquid may include, but are not limited to, bis(fluorosulfonyl)imide, bis(fluorosulfonyl)amide, fluoroborate, and fluorophosphate. Specific examples of the cations may include alkyl ammonium such as triethyl ammonium, imidazolium such as ethylmethyl imidazolium or butylmethyl imidazolium, pyrrolidinium such as 1-methyl-1-propyl pyrrolidinium, and piperidinium such as methylpropyl piperidinium. Specific examples of the anions may include bis(trifluoromethylsulfonyl)imide (TFSI), bis(pentafluoroethylsulfonyl)amide (BETI), tetrafluoroborate ($BF_4$), and hexafluorophosphate ($PF_6$).

Specific examples of the ionic liquid may include, but are not limited to, [emim]Cl/$AlCl_3$ (emim=ethyl methyl imidazolium), [bmpyr]$NTf_2$ (bmpyr=butyl methyl pyridinium), [bpy]Br/$AlCl_3$ (bpy=4,4'-bipyridine), [choline]Cl/$CrCl_3.6H_2O$, $[Hpy(CH_2)_3pyH][NTf_2]_2$ (NTf=trifluoromethanesulfonimide), [emim]OTf/[hmim]I (hmim=hexyl methyl imidazolium), [choline]Cl/$HOCH_2CH_2OH$, $[Et_2MeN(CH_2CH_2OMe)]BF_4$ (Et=ethyl, Me=methyl, Pr=propyl, Bu=butyl, Ph=phenyl, Oct=octyl, Hex=hexyl), $[Bu_3PCH_2CH_2CsF_{17}]OTf$ (OTf=trifluoromethane sulfonate), [bmim]$PF_6$ (bmim=butyl methyl imidazolium), [bmim]$BF_4$, [omim]$PF_6$ (omim=octyl methyl imidazolium), $[Oct_3PC_{18}H_{37}]I$, $[NC(CH_2)_3mim]$ $NTf_2$ (mim=methyl imidazolium), $[Pr_4N][B(CN)_4]$, [bmim] $NTf_2$, [bmim]Cl, $[bmim][Me(OCH_2CH_2)_2OSO_3]$, $[PhCH_2mim]OTf$, $[Me_3NCH(Me)CH(OH)Ph]NTf_2$, [pmim] $[(HO)_2PO_2]$ (pmim=propyl methyl imidazolium), [b(6-Me) quin]$NTf_2$ (bquin=butyl quinolinium), [bmim][$Cu_2Cl_3$], $[C_{18}H_{37}OCH_2mim]BF_4$ (mim=methyl imidazolium), [heim] $PF_6$ (heim=hexyl ethyl imidazolium), $[mim(CH_2CH_2O)_2 CH_2CH_2mim][NTf_2]_2$(mim=methyl imidazolium), [obim] $PF_6$ (obim=octyl butyl imidazolium), [oquin]$NTf_2$ (oquin=octyl quinolinium), $[hmim][PF_3 (C_2F_5)_3]$, $[C_{14}H_{29}mim]Br$ (mim=methyl imidazolium), $[Me_2N (C_{12}H_{25})_2]NO_3$, [emim]$BF_4$, [mm(3-$NO_2$)im][dinitrotriazolate], $[MeN(CH_2CH_2OH)_3]$, $[MeOSO_3]$, $[Hex_3PCl_4H_{29}]$ $NTf_2$, $[emim][EtOSO_3]$, [choline][ibuprofenate], [emim] $NTf_2$, $[emim][(EtO)_2PO_2]$, $[emim]Cl/CrCl_2$, and $[Hex_3PC_{14}H_{29}]N(CN)_2$. Any ionic liquid may be used as long as it suitable for use in a lithium battery.

A non-limiting example of the coating method may be a solvent casting method.

The lithium battery according to an embodiment is an all-solid lithium battery. The plurality of lithium batteries is laminated to form a battery pack, and this battery pack may be used for various appliances requiring high capacity and high power. For example, this battery pack may be used for notebooks, smart phones, electric vehicles, and the like.

The lithium battery is suitable for electric vehicles ("EVs") because it exhibits good thermal stability and good battery characteristics. For example, the lithium battery is suitable for hybrid vehicles such as plug-in hybrid electric vehicles ("PHEVs").

Further, there is provided a method of preparing the aforementioned sulfide-based solid electrolyte, including: mixing a metal-organic framework with a sulfide electrolyte to obtain a mixture; and pressure-molding the mixture.

When pressure-molding the mixture of the metal-organic framework and the sulfide electrolyte, the pressure ranges from 1 ton per square centimeter (ton/$cm^2$) to 10 ton/$cm^2$. When the pressure molding is carried out within the above pressure range, it is possible to prepare a sulfide-based solid electrolyte having improved hydrogen sulfide adsorption abilities as well as improved mechanical properties and ion conductivity.

Hereinafter, an embodiment of the present disclosure will be described in detail with reference to the following examples. However, these examples are not intended to limit the scope of the one or more embodiments of the present disclosure.

EXAMPLES

Preparation Example 1

Preparation of Metal-Organic Framework ($Ti_8O_8(OH)_4 \{O_2C—C_6H_4—CO_2\}_6$) (Ti-MOF)

Titanium isopropoxide and 1,4-benzene dicarboxylic acid were mixed in a mixed solvent (9:1 by volume) of methanol and N,N-dimethylformamide to obtain a mixture. The amounts of titanium isopropoxide and 1,4-benzene dicarboxylic acid in the mixture were stoichiometrically controlled to obtain $Ti_8O_8(OH)_4\{O_2C—C_6H_4—CO_2\}_6$ as a target product. A total amount of the mixed solvent was adjusted to be about 150 times the amount of titanium isopropoxide by weight.

The mixture was then thermally treated at about 150° C. for about 24 hours.

After completion of the reaction, the resulting reaction product was cooled down to room temperature (about 20° C. to about 25° C.). The cooled reaction product was washed with methanol and then with N,N-dimethylformamide, and then dried at about 120° C. for about 24 hours to obtain $Ti_8O_8(OH)_4\{O_2C-C_6H_4-CO_2\}_6)$ (hereinafter, referred to as "TiMOF") as a metal-organic framework.

Example 1

A sulfide electrolyte $Li_6PS_5Cl$ (190 milligrams (mg)) and Ti-MOF (10 mg) obtained in Preparation Example 1 were mixed, and then the mixture was pressed using a pressure of about 4 tons/cm² to prepare a sulfide-based solid electrolyte having a pellet form with a thickness of about 1 millimeter (mm) and a diameter of about 13 mm. The content of Ti-MOF in the sulfide-based solid electrolyte is 5 parts by weight, based on 100 parts by weight of the sulfide-based solid electrolyte.

Examples 2 to 6 and 6-1

Sulfide-based solid electrolytes were prepared in the same manner as in Example 1, except that the compositions of the metal-organic framework ("MOF") and sulfide electrolyte were changed as given in Table 1.

TABLE 1

|  | Content of Ti-MOF (parts by weight) | Type of MOF | Sulfide electrolyte |
| --- | --- | --- | --- |
| Example 2 | 0.1 | Ti-MOF | $Li_6PS_5Cl$ |
| Example 3 | 10 | Ti-MOF | $Li_6PS_5Cl$ |
| Example 4 | 5 | $Cu(bpy)(H_2O)_2(BF_4)_2(bpy)(CuMOF)$ | $Li_6PS_5Cl$ |
| Example 5 | 5 | $Zn_4O(O_2C-C_6H_4-CO_2)_3$ (Zn-terephthalic acid-MOF, Zn-MOF) | $Li_6PS_5Cl$ |
| Example 6 | 5 | Ti-MOF | $Li_7PS_6$ |
| Example 6-1 | 5 | Ti-MOF | $Li_6PS_5SeCl$ |

Comparative Example 1

Preparation of Solid Electrolyte $Li_6PS_5Cl$ (200 mg) was pressed using a pressure of about 4 tons/cm² to prepare a solid electrolyte with a thickness of about 1 mm.

Example 7

Manufacture of Lithium Battery (Li/Li Symmetric Cell)

Lithium anodes were laminated on both sides of the sulfide-based solid electrolyte of Example 1 to manufacture a Li/Li symmetric cell.

Comparative Example 2

Manufacture of Lithium Battery (Li/Li Symmetric Cell)

Lithium anodes were laminated on both sides of the solid electrolyte of Comparative Example 1 to manufacture a Li/Li symmetric cell.

Examples 8 to 13

Manufacture of Lithium Battery (Li/Li Symmetric Cell)

Li/Li symmetric cells were manufactured in the same manner as in Example 7, except that the sulfide-based solid electrolytes of Examples 2 to 6 and the sulfide-based solid electrolyte of Example 6-1 were respectively used instead of the sulfide-based solid electrolyte.

Evaluation Example 1

Scanning Electron Microscope (SEM) Analysis

The scanning electron microscope analysis of Ti-MOF of Preparation Example 1 was carried out. A scanning electron microscope JSM-7500F having an acceleration voltage of 20 kV was used, and the results of electron microscope analysis are shown in FIG. 2.

Figure 2:
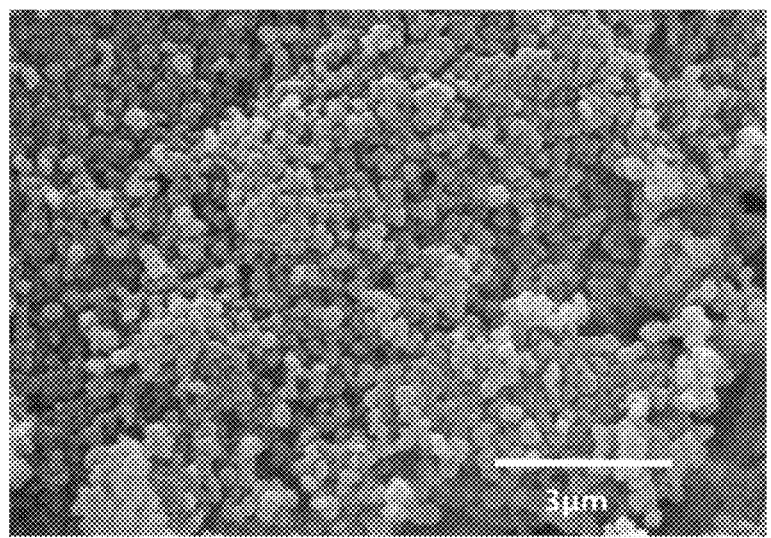
FIG. 2 is a photograph showing the results of scanning electron microscope analysis of a metal-organic framework according to Preparation Example 1.

Referring to FIG. 2, it may be found that the Ti-MOF obtained in Preparation Example 1 has a nanosphere shape having a uniform size (average diameter) of about 550 nm.

In order to effectively adsorb hydrogen sulfide in the sulfide-based solid electrolyte and improve mechanical properties, a uniform nanosized Ti-based metal-organic framework was synthesized.

Evaluation Example 2

X-Ray Diffraction Analysis

Figure 3:
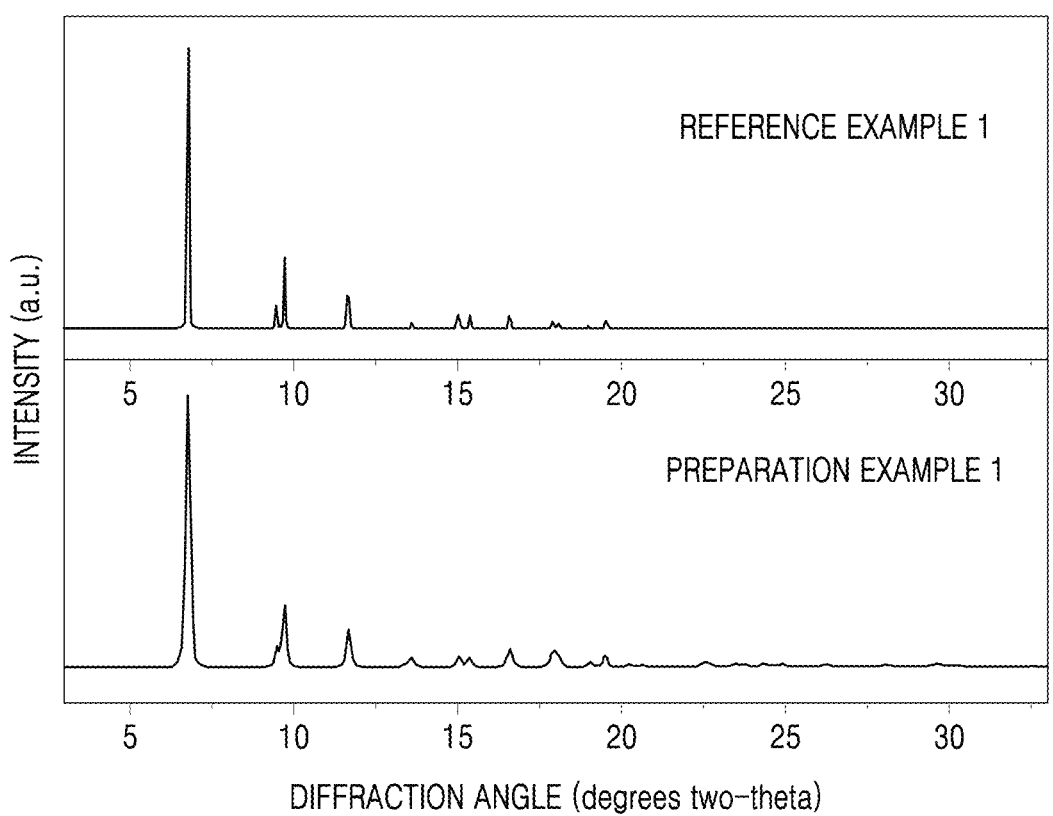
FIG. 3 is a graph of intensity (arbitrary units, a.u.) versus diffraction angle (degrees two-theta) showing the results of X-ray diffraction analysis of metal-organic frameworks according to Preparation Example 1 and Reference Example 1.

The X-ray diffraction analysis of the Ti-MOF of Preparation Example 1 and the solid electrolyte of Reference Example 1 using CuKα radiation were carried out, and the results thereof are shown in FIG. 3. The X-ray diffraction analysis thereof was carried out by a Rigaku RINT2200HF diffractometer using CuKα radiation (1.540598 angstroms (Å)), and the results of the X-ray diffraction analysis are shown in FIG. 3. Reference Example 1 is a diffraction pattern of Ti-MOF obtained using a computer simulation.

Referring to FIG. 3 and the results of specific surface area analysis of Evaluation Example 4 to be described later, it was found that the nanosized metal-organic framework includes pores having a specific surface area of about 1120 cm²/g and a size of about 3.6 Å, and thus is capable of adsorbing hydrogen sulfide.

Evaluation Example 3

Dynamic Laser Scattering Analysis

The diameter distribution of primary particles of Ti-MOF prepared in Preparation Example 1 was observed using dynamic laser scattering (DLS). The results thereof are shown in Table 2 and FIG. 4. The LA-950 dynamic laser scattering apparatus, manufactured by HORIBA Corporation, was used in the observation.

TABLE 2

|  | Average particle diameter (μm) | Standard deviation (σ) | F (σ²/μ) |
| --- | --- | --- | --- |
| Preparation Example 1 | 0.12634 | 0.0344 | 0.12204 |

In Table 2 above, $F(\sigma^2/\mu)$ is a factor indicating a diameter distribution of primary particles of the metal-organic framework. $\sigma^2$ indicates a variance of primary particles of the metal-organic framework, the variance is equivalent to a square of a standard deviation of average particle diameters of the primary particles of the metal-organic frame work, and μ indicates an average particle diameter of the primary particles of the metal-organic frame work.

Figure 4:
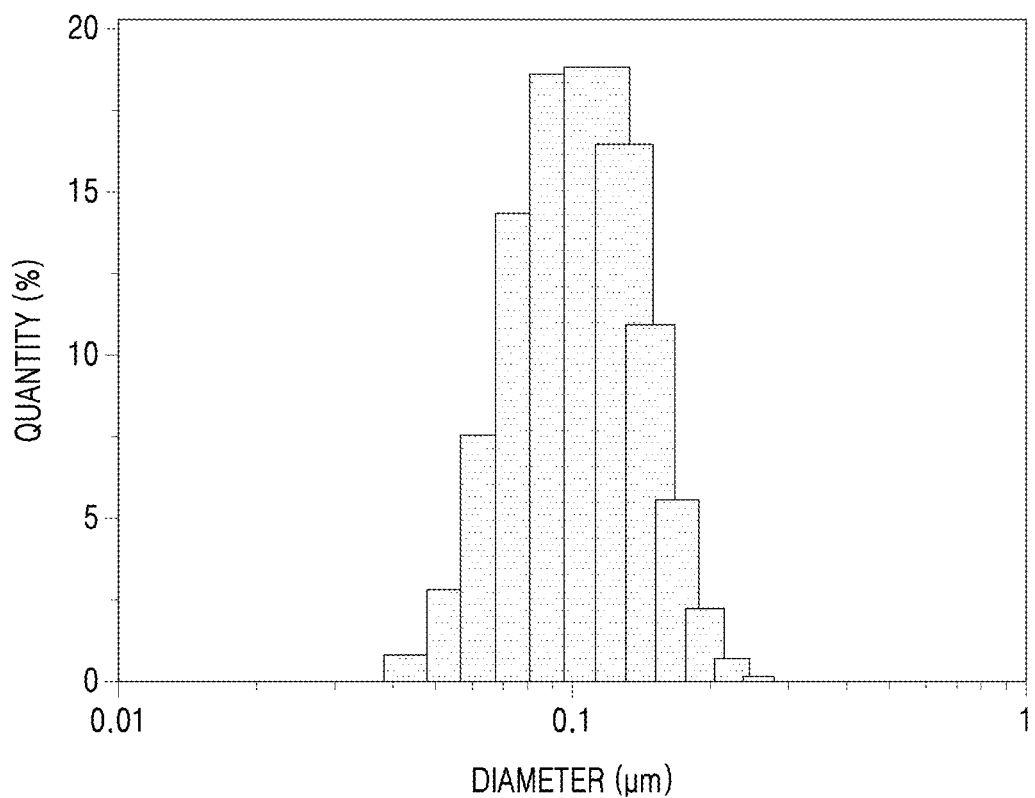
FIG. 4 is a graph quantity (percent) versus diameter (micrometers, μm) showing the results of dynamic laser scattering analysis of a metal-organic framework according to Preparation Example 1.

Referring to Table 2 and FIG. 4, F, which is a factor indicating a diameter distribution of primary particles of the metal-organic framework of Preparation Example 1, is less than 1.0. Thus, it may be found that the primary particles of the metal-organic framework of Preparation Example 1 have a uniform particle diameter close to the average particle size thereof.

According to the results of the SEM analysis and dynamic laser scattering analysis, it was found that a uniform nano-sized Ti-based metal-organic framework having an average size of about 120 nm was synthesized.

Evaluation Example 4

Pore Characteristic Analysis (Nitrogen Adsorption/Desorption Curve)

The Ti-MOF obtained in Preparation Example 1 was degassed under a vacuum at 150° C. for 24 hours, and then a nitrogen adsorption experiment was carried out. In the nitrogen adsorption experiment, nitrogen was adsorbed and desorbed on and from powder of the Ti-MOF, the specific surface area and pore volume of the Ti-MOF were calculated by a difference between the amount of adsorbed nitrogen and the amount of desorbed nitrogen to obtain a pore size distribution, and an average pore size was calculated based on the pore size distribution. The BELSORP-max nitrogen adsorption apparatus, manufactured by BEL Corporation, was used.

Specifically, the specific surface area of pores within a relative nitrogen pressure ($P/P_0$) range of 0 to 1.0 was calculated using the Brunauer-Emmett-Teller ("BET") method from the nitrogen adsorption-desorption isothermal line obtained in the nitrogen adsorption experiment. The results thereof are shown in Table 3 and FIG. 5.

TABLE 3

| | Specific surface area ($m^2/g$) | Pore volume ($cm^3/g$) | Pore size (Å) |
|---|---|---|---|
| Preparation Example 1 | 1120 | 0.9924 | 3.5598 |

Figure 5:
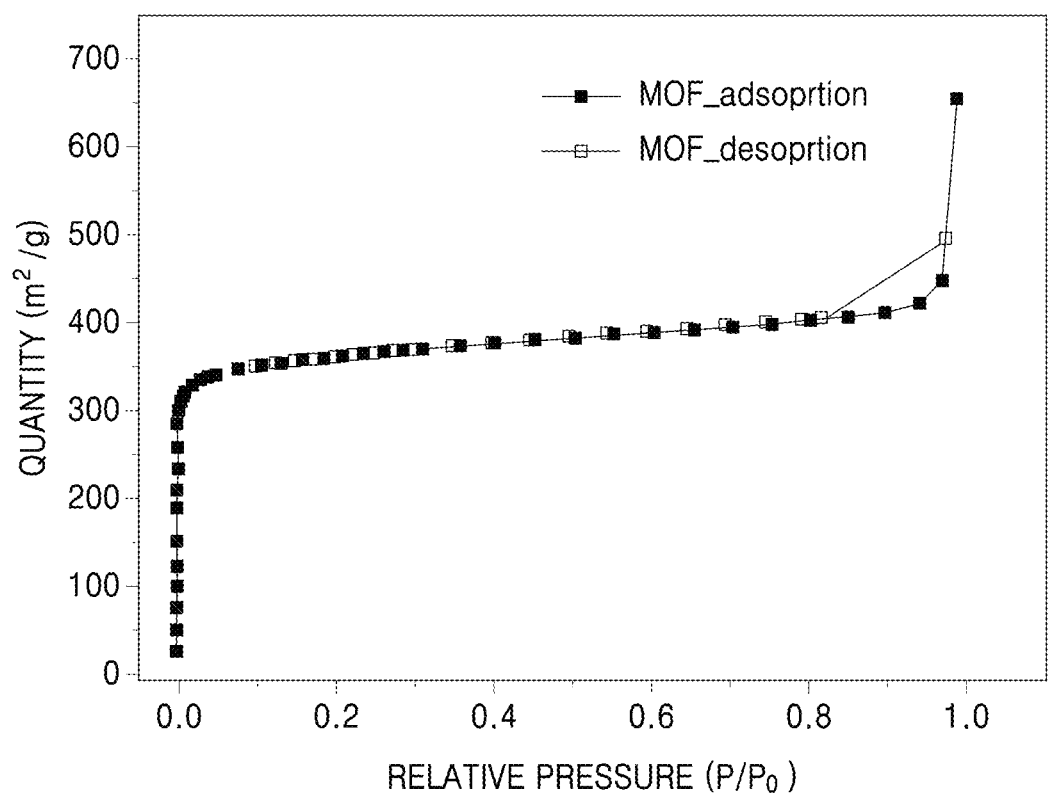
FIG. 5 is a graph of quantity (square meters per gram, $m^2/g$) versus relative pressure ($P/P_0$) showing the results of Brunauer-Emmett-Teller ("BET") specific surface area analysis of a metal-organic framework according to Preparation Example 1.

Referring to FIG. 5, it may be found that the specific surface area of the metal-organic framework of Preparation Example 1 is about 1120 $m^2/g$. Subsequently, the total volume of pores was directly derived from the calculated specific surface area and the Y-axis of the nitrogen adsorption-desorption isothermal line, a pore size distribution was obtained using the Barrett-Joyner-Halenda ("BJJ") method, and an average pore size was calculated from the pore size distribution. In this case, the average pore size is about 3.5 nm.

From the above results, it may be found that the metal-organic framework of Preparation Example 1 has a mesoporous structure having a specific surface area of 1000 $m^2/g$ or more.

Evaluation Example 5

Hydrogen Sulfide Generation Analysis

Figure 6:
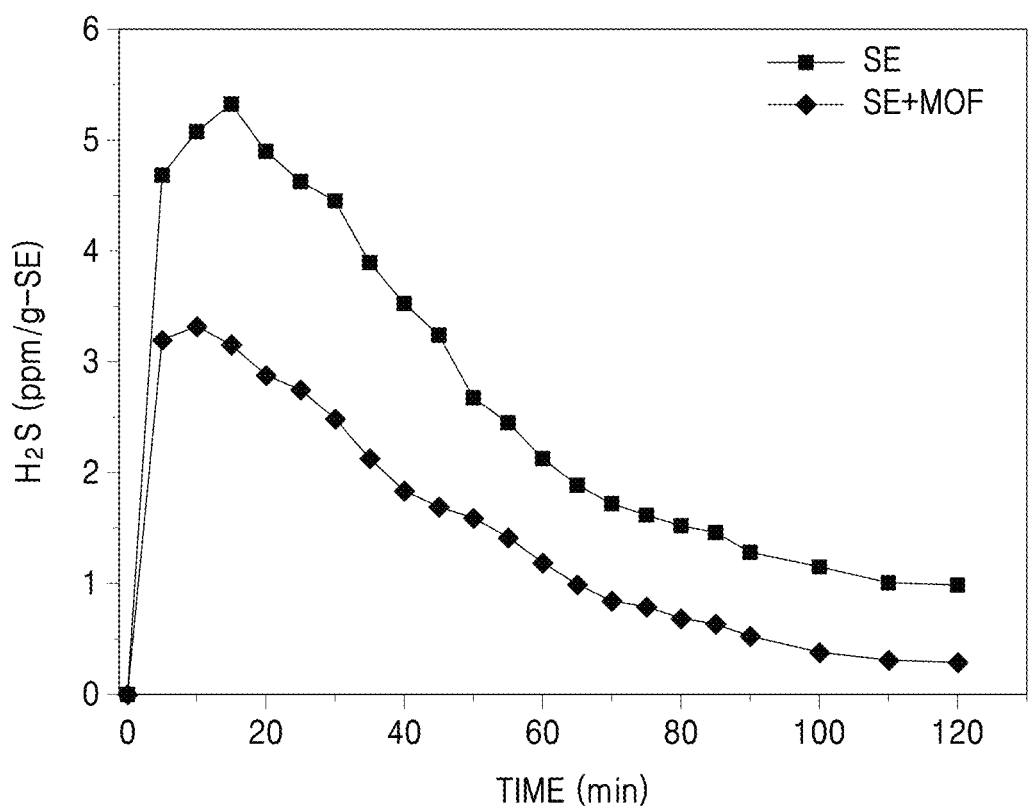
FIG. 6 is a graph of $H_2S$ (parts per million per gram of solid electrolyte, ppm/g-SE) versus time (minutes, min) showing the amount of hydrogen sulfide generated from the sulfide-based solid electrolyte of Example 1 according to moisture exposure time.
Figure 7:
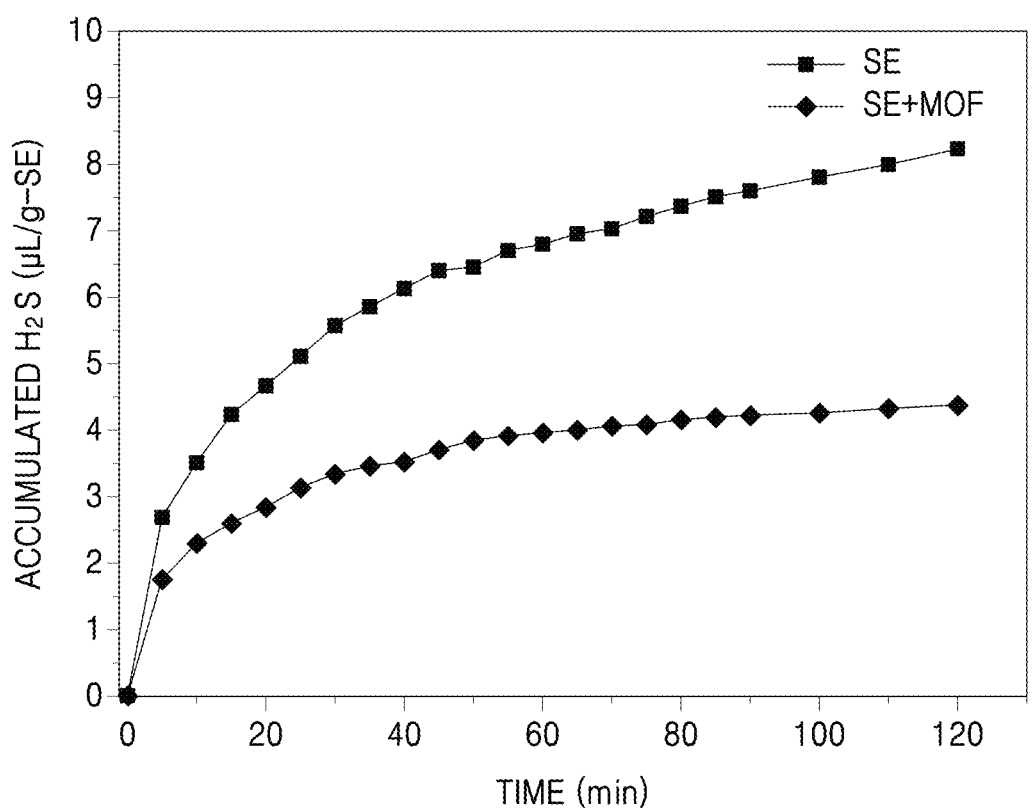
FIG. 7 is a graph of accumulated $H_2S$ (microliters per gram of solid electrolyte, μL/g-SE) showing the accumulated amount of hydrogen sulfide generated from the sulfide-based solid electrolyte of Example 1 according to moisture exposure time.

The sulfide-based solid electrolyte of Example 1 and the solid electrolyte of Comparative Example 1 were exposed to air at a dew point of about −30° C. and a temperature of about 20° C. for 2 hours, and then the generation amount of hydrogen sulfide generated from the solid electrolyte and the accumulation amount of hydrogen sulfide were measured. The analyzer used in measuring the generation amount of hydrogen sulfide and the accumulation amount of hydrogen sulfide is Breathview manufactured by AIOBIO Corporation. The analysis results thereof are shown in FIGS. 6 and 7. In FIGS. 6 and 7, "SE" stands for the solid electrolyte of Comparative Example 1, and "SE+MOF" stands for the sulfide-based solid electrolyte of Example 1.

Referring to FIGS. 6 and 7, it was found that the time at which the generation amount of hydrogen sulfide in the sulfide-based solid electrolyte of Example 1 including the Ti-MOF of Preparation Example 1 is maximized is about five minutes faster than that of the solid electrolyte of Comparative Example 1, and the maximum generation amount of hydrogen sulfide is reduced by about 39%. Further, it was found that as a result of comparing the accumulation amounts of two kinds of solid electrolyte pellets, the total amount of hydrogen sulfide generated from the sulfide-based solid electrolyte of Example 1 for 2 hours is reduced by 50%. Thus, it was found that when the sulfide-based solid electrolyte has pores therein and includes a uniform nanosized metal-organic framework, this sulfide-based solid electrolyte stores hydrogen sulfide generated due to direct exposure to air and moisture, thereby effectively suppressing the generation amount and a total generation amount of hydrogen sulfide over time.

Evaluation Example 5

Ion Conductivity

Lithium thin films were laminated on both sides of the sulfide-based solid electrolyte of Example 1 and both sides of the solid electrolyte of Comparative Example 1 to manufacture lithium symmetric cells, respectively.

Figure 8:
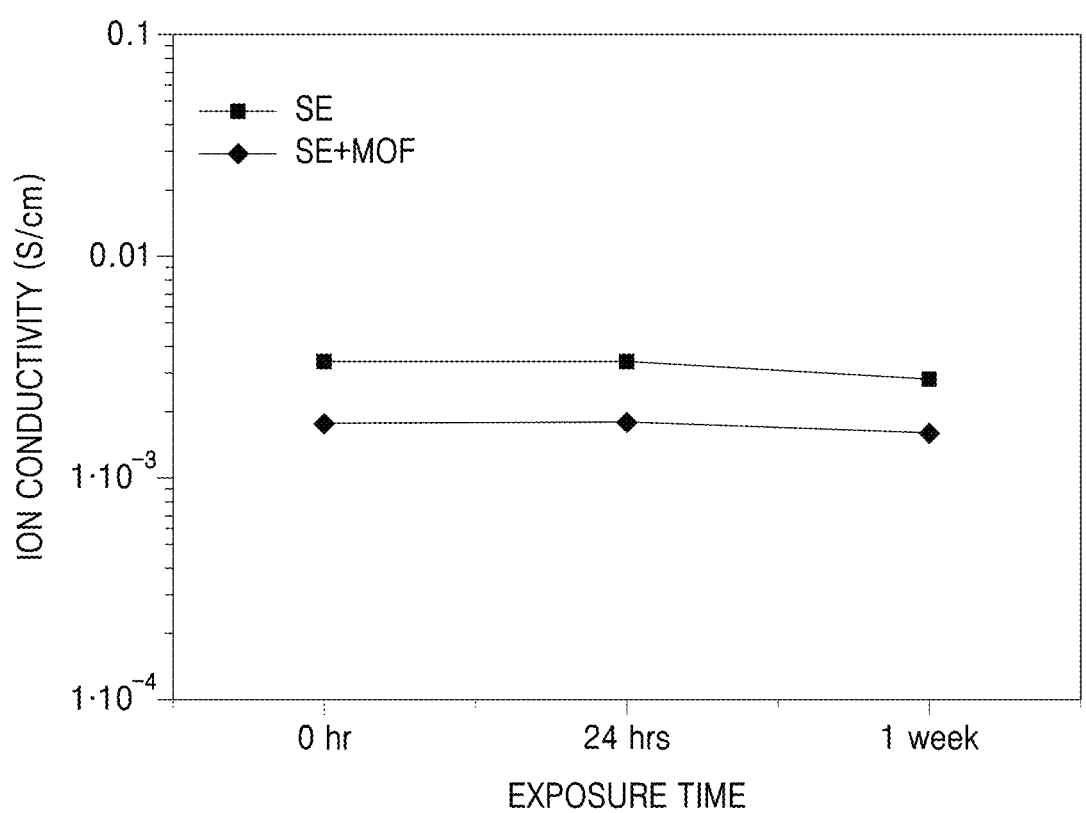
FIG. 8 is a graph of ion conductivity (Siemens per centimeter, S/cm) versus exposure time showing the ion conductivity of a lithium symmetric cell employing the sulfide-based solid electrolyte according to Example 1.
Figure 9:
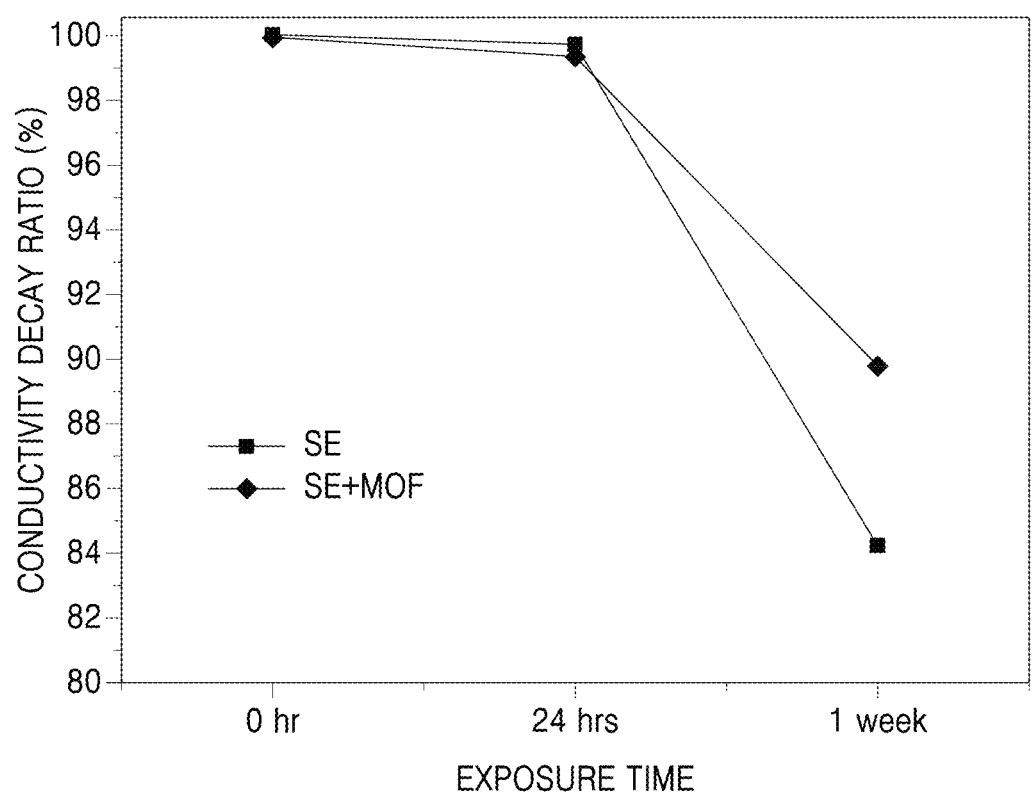
FIG. 9 is a graph of conductivity decay (percent, %) versus exposure time showing the ion conductivity with respect to initial ion conductivity in a lithium symmetric cell employing the sulfide-based solid electrolyte according to Example 1.

The change of ionic conductivity was measured while exposing each of the lithium symmetric cells to air at a dew point of −45° C. and a temperature 20° C. for one week, and the results thereof are shown in FIGS. 8 and 9. In FIGS. 8 and 9, "SE" stands for the solid electrolyte of Comparative Example 1, and "SE+MOF" stands for the sulfide-based solid electrolyte of Example 1.

Referring to FIGS. 8 and 9, it was found that the ion conductivity (1.78 mS/cm) of the sulfide-based solid electrolyte of Example 1 is reduced compared to the ion conductivity (3.35 mS/cm) of the solid electrolyte of Comparative Example 1, but there is no rapid reduction in ionic conductivity over time.

The ion conductivity of the sulfide-based solid electrolyte of Example 1 and the ion conductivity of the solid electrolyte of Comparative Example 1 were not greatly reduced after exposure to air at a dew point of −45° C. and a temperature 20° C. for 24 hours, but were changed after exposure to air at a dew point of −45° C. and a temperature of 20° C. for one week. After exposure to air at a dew point of −45° C. to 20° C. for one week, the ion conductivity decay ratio of the solid electrolyte of Comparative Example 1 is 90%, whereas the ion conductivity decay ratio of the sulfide-based solid electrolyte of Example 1 is reduced to 84%. From the results, it was found that the sulfide-based solid electrolyte of Example 1 adsorbs hydrogen sulfide generated due to exposure to moisture, thereby effectively suppressing the reduction of ion conductivity.

As described above, according to an embodiment, hydrogen sulfide that may be generated when a sulfide-based solid electrolyte is exposed to air is adsorbed in the sulfide-based solid electrolyte, so that it is possible to reduce the external exposure of hydrogen sulfide and prevent the deterioration of ion conductivity over time compared to when the sulfide-based solid electrolyte is used alone.

It should be understood that embodiment described herein should be considered in a descriptive sense only and not for purposes of limitation. Descriptions of features or aspects within each embodiment should be considered as available for other similar features or aspects in other embodiments.

While an embodiment has been described with reference to the figures, it will be understood by those of ordinary skill in the art that various changes in form and details may be made therein without departing from the spirit and scope as defined by the following claims.

What is claimed is:

1. A sulfide solid electrolyte comprising:
a sulfide electrolyte for a lithium battery; and
a metal-organic framework comprising hydrogen sulfide adsorbed in a pore of the metal-organic framework.

2. The sulfide solid electrolyte of claim 1,
wherein the metal-organic framework has a primary particle size of about 1 nanometer to about 1 micrometer, and
wherein the primary particle size of the metal-organic framework is in accordance with Formula 1:

$$0 < \sigma^2/\mu < 1, \quad \text{Formula 1}$$

wherein $\sigma^2$ is a size variance of a plurality of primary particles obtained by dynamic laser scattering, and $\mu$ is an average particle diameter of the plurality of primary particles.

3. The sulfide solid electrolyte of claim 1,
wherein a content of the metal-organic framework is about 0.1 parts by weight to about 50 parts by weight, based on 100 parts by weight of the sulfide solid electrolyte.

4. The sulfide solid electrolyte of claim 1,
wherein the sulfide electrolyte comprises $Li_2S$—$P_2S_5$, $LiI$—$Li_2S$—$B_2S_3$, $Li_3PO_4$—$Li_2S$—$Si_2S$, $Li_3PO_4$—$Li_2S$—$SiS_2$, $LiPO_4$—$Li_2S$—$SiS$, $LiI$—$Li_2S$—$P_2O_5$, $LiI$—$Li_3PO_4$—$P_2S_5$, $Li_3PS_4$, $Li_2S$—$P_2S_5$—$LiI$, $Li_2S$—$Si_2S_5$—$LiI$, $Li_2S$—$B_2S_3$—$LiI$, $Li_2S$—$Si_2S_5$—$Li_3N$, $Li_4Ge_{1-x}P_xS_4$ wherein $0<x<1$, $Li_{10\pm1}MP_2X_{12}$ wherein M is Ge, Si, Sn, Al, or a combination thereof, $Li_3PS_4$, $Li_4SnS_4$, $Li_{4-x}Sn_{4-a}As_aS_4$ wherein $0 \le x < 4$ and $0 < a < 4$, $Li_6Z^{5+}S_{5-a}X_a^{2-}T^-$ wherein $Z^{5+}$ is P, As, or Sb, $X^{2-}$ is Se, Te, or a combination thereof, $T^-$ is Cl, Br, I, F, CN, OCN, SCN, $N_3$, or a combination thereof, and $0 \le a \le 2$, $Li_7Z^{5+}S_{6-a}X_a^{2-}$, wherein $Z^{5+}$ is P, As, Sb, or a combination thereof, $X^{2-}$ is Se or Te, and $0 \le a \le 2$, or a combination thereof.

5. The sulfide solid electrolyte of claim 1,
wherein the sulfide electrolyte is $Li_6Z^{5+}S_{5-a}X_a^{2-}T^-$ wherein $Z^{5+}$ is P, As, or Sb, $X^{2-}$ is Se, Te, or a combination thereof, $T^-$ is Cl, Br, I, F, CN, OCN, SCN, $N_3$, or a combination thereof, and $0 \le a \le 2$, comprising an argyrodite crystal structure.

6. The sulfide solid electrolyte of claim 5,
wherein the sulfide electrolyte is $Li_6PS_5Cl$, $Li_7PS_6$, $Li_6PS_5SeCl$, or a combination thereof.

7. The sulfide solid electrolyte of claim 1,
wherein the metal-organic framework is a porous crystalline compound comprising a Group 2 to Group 15 metal ion or a Group 2 to Group 15 metal ion cluster, and an organic ligand chemically bound to the Group 2 to Group 15 metal ion or the Group 2 to Group 15 metal ion cluster,
wherein the Group 2 to Group 15 metal ion is cobalt, nickel, molybdenum, tungsten, ruthenium, osmium, cadmium, beryllium, calcium, barium, strontium, iron, manganese, chromium, vanadium, aluminum, titanium, zirconium, copper, zinc, magnesium, hafnium, niobium, tantalum, rhenium, rhodium, iridium, palladium, platinum, silver, scandium, yttrium, indium, thallium, silicon, germanium, tin, lead, arsenic, antimony, bismuth, or a combination thereof, and
wherein the organic ligand is derived from an aromatic dicarboxylic acid, an aromatic tricarboxylic acid, an imidazole compound, a tetrazole, 1,2,3-triazole, 1,2,4-triazole, pyrazole, an aromatic sulfonic acid, an aromatic phosphoric acid, an aromatic sulfinic acid, an aromatic phosphinic acid, a bipyridine, an amino functional group, an imino functional group, an amide functional group, a methane dithio acid functional group of the formula —$CS_2H$, a methane dithio acid anion functional group of the formula —$CS_2^-$, a pyridine functional group, or a pyrazine functional group, a combination thereof.

8. The sulfide solid electrolyte of claim 1,
wherein the metal-organic framework is a compound represented by Formula 1:

$$M_m O_k X_l L_p, \quad \text{Formula 1}$$

wherein, in Formula 1,
M is $Ti^{4+}$, $Zr^{4+}$, $Mn^{4+}$, $Si^{4+}$, $Al^{3+}$, $Cr^{3+}$, $V^{3+}$, $Ga^{3+}$, $Mn^{3+}$, $Zn^{+3}$, $Mn^{2+}$, $Mg^{2+}$, $Fe^{2+}$, $Fe^{3+}$, $Cu^{+2}$, or a combination thereof,
m is an integer from 1 to 10,
k is 0 or an integer from 1 to 10,
l is 0 or an integer from 1 to 10,
p is an integer from 1 to 10,
X is H, $OH^-$, $Cl^-$, $F^-$, $F^-$, $Br^-$, $SO_4^{2-}$, $NO_3^-$, $ClO_4^-$, $PF_6^-$, $BF_3^-$, $R^1$—$(COO)_n^-$, $R^1$—$(SO_3)_n^-$, or $R^1$—$(PO_3)_n^-$, wherein $R^1$ is hydrogen, a C1-C30 alkyl group, or a combination thereof,
n is an integer from 1 to 4, and
L is a ligand of the formula R—(*COO—#)$_q$, wherein q is an integer from 1 to 6, * indicates a binding site of the carboxylate group to R, # indicates a binding site of the carboxylate group to metal ion M, and R is a substituted or unsubstituted C1-C30 alkyl group, a substituted or unsubstituted C2-C30 alkenyl group, a substituted or unsubstituted C2-C30 alkynyl group, a substituted or unsubstituted monocyclic C6-C30 aryl group, a substituted or unsubstituted polycyclic C10-C30 aryl group, a substituted or unsubstituted monocyclic C3-C30 heteroaryl group, or a substituted or unsubstituted polycyclic C10-C30 heteroaryl group.

9. The sulfide solid electrolyte of claim 1, wherein the metal-organic framework is a compound represented by Formula 2:

$$M'_m O_k X'_l L'_p \quad \text{Formula 2}$$

wherein
M' is $Ti^{4+}$, $Zr^{4+}$, $V^{3+}$, $Zn^{+3}$, $Fe^{2+}$, $Fe^{3+}$, $Cu^{+2}$, or a combination thereof,
L' is terephthalate), fumarate, muconate, 2,5-thiophenedicarboxylate, 2,5-pyrazine dicarboxylate, succinate, glutarate, adipate, naphthalene-2,6-dicarboxylate, biphenyl-4,4'-dicarboxylate, azobenzenedicarboxylate, benzene-1,2,4-tricarboxylate, benzene-1,3,5-tricarboxylate, benzene-1,3,5-tribenzoate, benzene-1,2,4,5-tetracarboxylate, naphthalene-2,3,6,7-tetracarboxylate, naphthalene-1,4,5,8-tetracarboxylate, and biphenyl-3,5,3',5'-tetracarboxylate, or a combination thereof,
X' is $OH^-$, $Cl^-$, $F^-$, $CH_3COO^-$, $PF_6^-$, $ClO_4^-$, or a combination thereof, and
m is an integer from 1 to 8, k is an integer from 0 to 8, l is an integer from 0 to 8, and p is an integer from 1 to 8.

10. The sulfide solid electrolyte of claim 1,
wherein the metal-organic framework is $Ti_8O_8(OH)_4[O_2C\text{—}C_6H_4\text{—}CO_2]_6$, $Cu(bpy)(H_2O)_2(BF_4)_2(bpy)$ wherein bpy is 4,4'-bipyridine, $Zn_4O(O_2C\text{—}C_6H_4\text{—}CO_2)$, $Al(OH)\{O_2C\text{—}C_6H_4\text{—}CO_2\}$, $Ti_8O_8(OH)_4[O_2C\text{—}C_6H_3(NH_2)\text{—}CO_2]_6$, $VO[C_6H_4(CO_2)_2]$, $Cr(OH)[C_6H_4(CO_2)_2]$, $Al(OH)[C_{10}H_6(CO_2)_2]$, $Al_1O(OH)_{18}(H_2O)_3[C_6H_3\text{—}(CO_2)_3]_6 \cdot nH_2O$, $Cr_3OX_1[C_6H_4(CO_2)_2]_3$ wherein X is H, $OH^-$, $Cl^-$, $F^-$, $CH_3COO^-$, $PF_6^-$, $ClO_4^-$, or a combination thereof, and 1 is an integer from 0 to 8, $Cr_3OX_1[C_{12}H_8(CO_2)_2]_3$, where X is H, $OH^-$, $Cl^-$, $F^-$, $CH_3COO^-$, $PF_6^-$, $ClO_4^-$, or a combination thereof; and 1 is an integer from 0 to 8, $Al_8(OH)_{15}(H_2O)_3[C_6H_3(CO_2)_3]_3$, $V_3OX_1[C_6H_3(CO_2)_3]_3$, wherein X is H, $OH^-$, $Cl^-F^-$, $CH_3COO^-$, $PF_6^-$, $ClO_4^-$, or a combination thereof, and 1 is an integer from 0 to 8, $ZrO[C_6H_4(CO_2)_2]$, or a combination thereof.

11. The sulfide solid electrolyte of claim 1,
wherein the metal-organic framework has a pore size of less than or equal to 5 nanometers.

12. The sulfide solid electrolyte of claim 1,
wherein an amount of hydrogen sulfide generated from the sulfide solid electrolyte is less than or equal to 10 cubic centimeters per gram when the sulfide solid electrolyte is exposed to air.

13. The sulfide solid electrolyte of claim 1,
wherein, when the sulfide solid electrolyte is exposed to air at a dew point of −32° C. to −28° C. and a temperature of 20° C. to 25° C., an amount of hydrogen sulfide generated from the sulfide solid electrolyte is reduced by about 40% to about 60% and a maximum hydrogen sulfide discharge time is reduced by about 20% to about 30%, as compared with a sulfide solid electrolyte not including the metal-organic framework.

14. The sulfide solid electrolyte of claim 1,
wherein the sulfide solid electrolyte has a thickness of about 1 nanometer to about 1,000 micrometers.

15. The sulfide solid electrolyte of claim 1,
wherein, the sulfide solid electrolyte has a major peak at less than or equal to 5 degrees two-theta, when analyzed by X-ray diffraction analysis using Cu Kα radiation.

16. A lithium battery comprising:
a cathode, wherein the cathode does not comprise sulfur;
an anode; and
a sulfide solid electrolyte comprising
    a sulfide electrolyte, and
    a metal-organic framework between the cathode and the anode, the metal-organic framework comprising hydrogen sulfide adsorbed in a pore of the metal-organic framework.

17. The lithium battery of claim 16,
wherein the anode is a lithium metal electrode or a lithium metal alloy electrode, and
wherein the anode comprises an anode active material, wherein the anode active material comprises a carbonaceous material, silicon, a silicon oxide, a silicon alloy, a silicon-carbon composite, tin, a tin alloy, a tin-carbon composite, a metal or metalloid alloyable with lithium, an alloy thereof, an oxide thereof, or a combination thereof.

18. The lithium battery of claim 16, wherein the lithium battery is an all-solid battery.

19. The lithium battery of claim 16,
wherein the sulfide solid electrolyte of the lithium battery has an ion conductivity of greater than or equal to 1 millisiemens per centimeter after exposure to dry air, and
wherein an ion conductivity of the sulfide solid electrolyte is reduced about 5% to about 15% less than an ion conductivity of a sulfide solid electrolyte not including the metal-organic framework when exposed to air at a dew point of −32° C. to −28° C. and a temperature of 20° C. to 25° C.

20. A method of preparing the sulfide solid electrolyte of claim 1, comprising:
mixing the metal-organic framework with the sulfide electrolyte to obtain a mixture; and
pressure-molding the mixture to prepare the sulfide solid electrolyte.

* * * * *